United States Patent
Fang et al.

(10) Patent No.: US 11,172,239 B2
(45) Date of Patent: Nov. 9, 2021

(54) MEDIA INFORMATION PROCESSING METHOD AND APPARATUS

(71) Applicant: Huawei Technologies Co., Ltd., Shenzhen (CN)

(72) Inventors: Huameng Fang, Shenzhen (CN); Peiyun Di, Shenzhen (CN); Yuqun Fan, Shenzhen (CN)

(73) Assignee: HUAWEI TECHNOLOIES CO., LTD., Shenzhen (CN)

( * ) Notice: Subject to any disclaimer, the term of this patent is extended or adjusted under 35 U.S.C. 154(b) by 0 days.

(21) Appl. No.: 16/926,080

(22) Filed: Jul. 10, 2020

(65) Prior Publication Data
US 2020/0344499 A1    Oct. 29, 2020

Related U.S. Application Data

(63) Continuation of application No. PCT/CN2019/070480, filed on Jan. 4, 2019.

(30) Foreign Application Priority Data

Jan. 12, 2018 (CN) .......................... 201810032638.1

(51) Int. Cl.
| | |
|---|---|
| *H04N 21/218* | (2011.01) |
| *H04N 21/234* | (2011.01) |
| *H04N 21/235* | (2011.01) |
| *H04N 21/44* | (2011.01) |
| *H04N 21/81* | (2011.01) |
| *H04N 21/84* | (2011.01) |

(52) U.S. Cl.
CPC ..... *H04N 21/21805* (2013.01); *H04N 21/234* (2013.01); *H04N 21/235* (2013.01); *H04N 21/44016* (2013.01); *H04N 21/816* (2013.01); *H04N 21/84* (2013.01)

(58) Field of Classification Search
None
See application file for complete search history.

(56) References Cited

U.S. PATENT DOCUMENTS

| | | |
|---|---|---|
| 10,547,867 B2 | 1/2020 | Ugur |
| 2014/0086333 A1 | 3/2014 | Wang |

(Continued)

FOREIGN PATENT DOCUMENTS

| | | |
|---|---|---|
| CN | 103780920 A | 5/2014 |
| CN | 105556965 A | 5/2016 |

(Continued)

OTHER PUBLICATIONS

Gang, W., et al. "Three-dimensional Panoramic Virtual Campus Roaming System Research and Implementation," Modern Educational Technology, vol. 23, No. 5, 2013, 5 pages. With English abstract.

(Continued)

*Primary Examiner* — Justin E Shepard
(74) *Attorney, Agent, or Firm* — Conley Rose, P.C.

(57) ABSTRACT

A media information processing method includes obtaining sub-bitstream data, where the sub-bitstream data includes indication information, and the indication information is used to indicate an amount of tile data included in the sub-bitstream data, or the indication information is used to indicate whether the sub-bitstream data can be used for splicing, and processing the sub-bitstream data based on the indication information.

20 Claims, 14 Drawing Sheets

(56) References Cited

U.S. PATENT DOCUMENTS

| | | |
|---|---|---|
| 2014/0267593 A1 | 9/2014 | Kim et al. |
| 2014/0301464 A1 | 10/2014 | Wu et al. |
| 2015/0172692 A1 | 6/2015 | Yang et al. |
| 2017/0118540 A1 | 4/2017 | Thomas et al. |
| 2017/0134795 A1 | 5/2017 | Tsiridis et al. |
| 2017/0302949 A1 | 10/2017 | Vadakital et al. |

FOREIGN PATENT DOCUMENTS

| | | |
|---|---|---|
| CN | 106331480 A | 1/2017 |
| CN | 107005715 A | 8/2017 |
| CN | 107318008 A | 11/2017 |
| EP | 2739040 A1 | 6/2014 |
| WO | 2014047943 A1 | 4/2014 |
| WO | 2017029400 A1 | 2/2017 |

OTHER PUBLICATIONS

ISO/IEC FDIS 14496-15:2014, "Text of ISO/IEC FDIS 23090-2 Omnidirectional Media Format," Final Draft International Standard, ISO/IEC JTC1/SC29/WG11 N17235, Oct. 2017, Macau, China, 154 pages.

ISO/IEC 14496-12, Fifth edition, "Information technology—Coding of audiovisual objects—Part 12: ISO base media file format," Dec. 15, 2015, 248 pages.

MEDIA INFORMATION PROCESSING METHOD AND APPARATUS

CROSS-REFERENCE TO RELATED APPLICATIONS

This application is a continuation of International Patent Application No. PCT/CN2019/070480, filed on Jan. 4, 2019, which claims priority to Chinese Patent Application No. 201810032638.1, filed on Jan. 12, 2018. The disclosures of the aforementioned applications are hereby incorporated by reference in their entireties.

TECHNICAL FIELD

Embodiments of this application relate to the field of streaming media transmission technologies, and in particular, to a media information processing method and apparatus.

BACKGROUND

Currently, with increasing popularity of an application for watching a virtual reality (VR) video such as a 360-degree video, more users participate in a team to experience watching a VR video in a large viewport. This new video viewing application brings a new technical challenge while bringing a new video viewing mode and new visual experience to the users. During viewing a video in a large viewport such as 360 degrees, a spatial area of the VR video is 360-degree panoramic space, which exceeds a normal visual range of human eyes. Therefore, a user's viewing angle (or a viewport) is changed at any time during viewing the video. The user sees different video pictures in different viewports. Therefore, content presented in the video needs to change with the viewport of the user.

In a current video application scenario, especially in a current 360-degree panoramic video application and multi-channel video application, sometimes a user is interested only in a part of an entire picture. In this case, a client does not need to display all picture regions, but only needs to obtain a part of the entire picture to render and present the part of the entire picture on the client. In this application scenario, the client may splice sub-bitstreams required for presentation to obtain a conforming bitstream. In addition, to be compatible with an existing conforming codec, the sub-bitstreams can be spliced only when a specific condition is met.

As shown in FIG. 1, in an existing omnidirectional media application format (OMAF) standard, an additional metadata track is transmitted, and a track identifier (ID) of a sub-bitstream that can be spliced and a splicing method are marked in the track, the client instructs, using information about the track, a corresponding sub-bitstream to complete a splicing process according to an agreed arrangement. Finally, the conforming codec decodes a spliced picture bitstream (that is, a conforming bitstream), and renders and presents a decoded picture. In FIG. 1, an example in which a video picture is split into eight sub-pictures (that is, eight tiles) and requesting viewports of a client include 1, 2, 5, and 6 (four tiles) is used for description, and t0 to tN represent different time sequences.

However, the metadata track transmitted in the foregoing method requires an additional bandwidth. In addition, when there are a relatively large quantity of tracks in a sub-picture bitstream, there are a relatively large quantity of track combinations that may be spliced into the conforming bitstream, and therefore different metadata tracks need to be constructed, and therefore stream management is relatively complex.

SUMMARY

Embodiments of this application provide a media information processing method and apparatus. Information about an amount of tile data included in a bitstream or indication information about whether a bitstream can be used for splicing is added to substream data, to determine, based on the indication information, whether the bitstream can be used for splicing. This resolves a problem in other approaches that additional track information is required during bitstream splicing, saves transmission bandwidth, and lowers complexity of stream management.

To achieve the foregoing objective, the following technical solutions are used in the embodiments of this application.

According to a first aspect, a media information processing method is provided. The method includes obtaining sub-bitstream data, where the sub-bitstream data includes indication information, and the indication information is used to indicate an amount of tile data included in the sub-bitstream data, or the indication information is used to indicate whether the sub-bitstream data can be used for splicing, and processing the sub-bitstream data based on the indication information.

A method embodiment of this application may be performed by a device that has a video or picture decoding function, for example, a wearable device (such as an augmented reality (AR)/VR helmet or AR/VR glasses), an intelligent terminal (such as a mobile phone or a tablet computer), a television, or a set-top box.

In a possible implementation of the first aspect, a request may be obtained by sending media data, and then the media data is received, where the media data includes sub-bitstream data. For example, a terminal may construct a Uniform Resource Locator (URL) using a related attribute and address information in a media presentation description (MPD) file, then send an Hypertext Transfer Protocol (HTTP) request to the URL, and receive corresponding media data.

In a possible implementation of the first aspect, the media data may be obtained in a push manner, and the media data includes the sub-bitstream data. The media data in this embodiment of this application may mainly be data obtained after encoding and encapsulation are performed on a video or a picture. In some possible implementations, the media data in this embodiment of this application may alternatively be data obtained after encoding and encapsulation are performed on audio. The video includes a series of pictures.

In a possible implementation of the first aspect, for a related example of the media data, refer to related regulations of media data in the International Organization for Standardization (ISO)/International Electrotechnical Commission (IEC) 23090-2 standard specification.

The ISO/IEC 23090-2 standard specification is also referred to as an OMAF standard specification. The specification defines a media application format that can implement omnidirectional media presentation on an application. Omnidirectional media mainly refers to an omnidirectional video (360-degree video) and related audio. The OMAF specification first specifies a list of projection methods that may be used to convert a spherical video into a two-dimensional video, followed by how to use an ISO base media file format (ISOBMFF) to store the omnidirectional media and metadata associated with the media, and how to encapsulate and transmit data of the omnidirectional media in a streaming media system, for example, using Dynamic Adaptive Streaming over HTTP (DASH) or dynamic adaptive streaming specified in the ISO/IEC 23009-1 standard.

In a possible implementation of the first aspect, the picture in this embodiment of this application may be a complete picture captured by a capture device (such as a camera), or may be a picture obtained after a complete picture is split. For example, a resolution of a picture captured by the capture device is 1024×1024. In this case, the picture in this embodiment of this application may be a 1024×1024 picture, a 512×512 picture, a 1024×512 picture, a 512×1024 picture, or the like. This is not limited in this application.

In a possible implementation of the first aspect, picture data (for example, a video bitstream or an original bitstream) described in this embodiment of this application is data obtained after a picture is encoded based on a video coding technology, for example, may be picture data obtained after a picture is encoded using International Telecommunication Union (ITU) H.264, or picture data obtained after a picture is encoded using ITU H.265, or may be data obtained after a picture is encoded using another standard or a proprietary technology.

In a possible implementation of the first aspect, the indication information of the sub-bitstream data may be encapsulated in supplemental enhancement information (SEI).

In a possible implementation of the first aspect, the indication information of the sub-bitstream data may be encapsulated in a box of a track.

In a possible implementation of the first aspect, the indication information of the sub-bitstream data may be encapsulated in a MPD file. The MPD file includes some metadata files of the picture. The metadata refers to some attribute information, for example, duration, a bit rate, a frame rate, and a location in a spherical coordinate system. In an example, the MPD file may refer to a related regulation and example in the ISO/IEC 23009-1.

In a possible implementation of the first aspect, the indication information of the sub-bitstream data may be carried in a sample entry type of a track. Optionally, for the information about the amount of the tile data included in the sub-bitstream, a sample entry type 'onti' is added to the track. When a sample entry name is 'onti', it indicates that a sub-bitstream in a current track includes one piece of tile data, to indicate that the sub-bitstream can be used for splicing.

In a possible implementation of the first aspect, the indication information includes at least one identifier, and the identifier is used to indicate an amount of the tile data included in the sub-bitstream data. For example, the indication information may be a flag of one bit, and whether the amount of the tile data is 1 is indicated based on a value of the flag. The indication information may also be an indicator. Alternatively, the indication information may be a flag of two or more bits, and a value of the flag is directly used to indicate the amount of the tile data.

In a possible implementation of the first aspect, the sub-bitstream data further includes video parameter set (VPS) information, and the processing the sub-bitstream data based on the indication information includes processing the sub-bitstream data based on the indication information and the VPS information.

In a possible implementation of the first aspect, the sub-bitstream data further includes sequence parameter set (SPS) information, and the processing the sub-bitstream data based on the indication information includes processing the sub-bitstream data based on the indication information and the SPS information.

In a possible implementation of the first aspect, the sub-bitstream data further includes picture parameter set (PPS) information, and the processing the sub-bitstream data based on the indication information includes processing the sub-bitstream data based on the indication information and the PPS information.

In a possible implementation of the first aspect, the sub-bitstream data further includes slice segment (SS) information, and the processing the sub-bitstream data based on the indication information includes processing the sub-bitstream data based on the indication information and the SS information.

In a possible implementation of the first aspect, the sub-bitstream data further includes resolution information. If there are sub-bitstreams with different resolutions, the sub-bitstreams may be spliced in a manner that a tile includes a plurality of slices. Optionally, a plurality of low-resolution sub-bitstreams may be used as slices to form one piece of tile data. In other words, one piece of tile data in the spliced bitstream may include a plurality of slices. For example, if there are sub-bitstreams with two resolutions and same content, and the two resolutions are respectively 1024×1024 and 512×512, two 512×512 sub-bitstreams may be used as slices to form tile data.

In a possible implementation of the first aspect, when it is determined that a sub-bitstream cannot be used for splicing, the sub-bitstream may be directly decoded, and a decoded picture and a picture obtained after a spliced bitstream is decoded are spliced, to obtain a final display picture. Therefore, compared with discarding a sub-bitstream that cannot be used for splicing, this method can improve utilization of the sub-bitstream.

In the media information processing method provided in the first aspect, information about an amount of tile data included in the sub-bitstream or indication information used to indicate whether the sub-bitstream data can be used for splicing is added to each sub-bitstream such that whether the sub-bitstream can be used for splicing may be determined based on the indication information, and a plurality of sub-bitstreams that can be used for splicing are spliced. When a required bitstream is spliced and then decoded, only a single decoder is required to implement decoding in a sequence of a plurality of sub-pictures, and no additional track information needs to be transmitted, thereby saving bandwidth and simplifying complexity of stream management.

According to a second aspect, a media information processing method is provided. The method includes obtaining sub-bitstream data of an original image, determining indication information of the sub-bitstream data based on an amount of tile data included in the sub-bitstream data, where the sub-bitstream data includes indication information, and the indication information is used to indicate the amount of the tile data included in the sub-bitstream data, or the indication information is used to indicate whether the sub-bitstream data can be used for splicing, and sending the sub-bitstream data to a terminal, where the sub-bitstream data includes the indication information.

In a possible implementation of the second aspect, indication information of a sub-bitstream may be encapsulated in SEI.

In a possible implementation of the second aspect, the indication information of the sub-bitstream may be encapsulated in a box of a track.

In a possible implementation of the second aspect, the indication information of the sub-bitstream may be encapsulated in a sample entry type of a track.

In a possible implementation of the second aspect, the indication information of the sub-bitstream may be encapsulated in a MPD file.

In a possible implementation of the second aspect, the sub-bitstream data further includes VPS information, and the processing the sub-bitstream data based on the indication information includes processing the sub-bitstream data based on the indication information and the VPS information.

In a possible implementation of the second aspect, the sub-bitstream data further includes SPS information, and the processing the sub-bitstream data based on the indication information includes processing the sub-bitstream data based on the indication information and the SPS information.

In a possible implementation of the second aspect, the sub-bitstream data further includes PPS information, and the processing the sub-bitstream data based on the indication information includes processing the sub-bitstream data based on the indication information and the PPS information.

In a possible implementation of the second aspect, the sub-bitstream data further includes SS information, and the processing the sub-bitstream data based on the indication information includes processing the sub-bitstream data based on the indication information and the SS information.

In a possible implementation of the second aspect, the sub-bitstream data further includes resolution information. Optionally, there are sub-bitstreams with different resolutions. For example, if there are sub-bitstreams with two resolutions and same content, and the two resolutions are respectively 1024×1024 and 512×512, two 512×512 sub-bitstreams may be used as slices to form tile data.

According to a third aspect, a media information processing apparatus is provided. The apparatus includes an obtaining module configured to obtain sub-bitstream data, where the sub-bitstream data includes indication information, and the indication information is used to indicate an amount of tile data included in the sub-bitstream data, or the indication information is used to indicate whether the sub-bitstream data can be used for splicing, and a processing module configured to process the sub-bitstream data based on the indication information.

In a possible implementation of the third aspect, the indication information is carried in SEI.

In a possible implementation of the third aspect, the indication information is carried in a box of a track.

In a possible implementation of the third aspect, the indication information is carried in a sample entry type of a track.

In a possible implementation of the third aspect, the indication information is carried in a MPD file.

In a possible implementation of the third aspect, the sub-bitstream data further includes VPS information, and the processing module is further configured to process the sub-bitstream data based on the indication information and the VPS information.

In a possible implementation of the third aspect, the sub-bitstream data further includes SPS information, and processing module is further configured to process the sub-bitstream data based on the indication information and the SPS information.

In a possible implementation of the third aspect, the sub-bitstream data further includes PPS information, and the processing module is further configured to process the sub-bitstream data based on the indication information and the PPS information.

In a possible implementation of the third aspect, the sub-bitstream data further includes SS information, and the processing module is further configured to process the sub-bitstream data based on the indication information and the SS information.

In a possible implementation of the third aspect, the sub-bitstream data further includes resolution information.

According to a fourth aspect, a media information processing apparatus is provided. The apparatus includes an obtaining module configured to obtain sub-bitstream data of an original image, a processing module configured to determine indication information of the sub-bitstream data based on an amount of tile data included in the sub-bitstream data, where the sub-bitstream data includes indication information, and the indication information is used to indicate the amount of the tile data included in the sub-bitstream data, or the indication information is used to indicate whether the sub-bitstream data can be used for splicing, and a sending module configured to send the sub-bitstream data to a terminal, where the sub-bitstream data includes the indication information.

In a possible implementation of the fourth aspect, the indication information is carried in SEI.

In a possible implementation of the fourth aspect, the indication information is carried in a box of a track.

In a possible implementation of the fourth aspect, the indication information is carried in a sample entry type of a track.

In a possible implementation of the fourth aspect, the indication information is carried in a MPD file.

In a possible implementation of the fourth aspect, the sub-bitstream data further includes VPS information, and the processing module is further configured to process the sub-bitstream data based on the indication information and the VPS information.

In a possible implementation of the fourth aspect, the sub-bitstream data further includes SPS information, and the processing module is further configured to process the sub-bitstream data based on the indication information and the SPS information.

In a possible implementation of the fourth aspect, the sub-bitstream data further includes PPS information, and the processing module is further configured to process the sub-bitstream data based on the indication information and the PPS information.

In a possible implementation of the fourth aspect, the sub-bitstream data further includes SS information, and the processing module is further configured to process the sub-bitstream data based on the indication information and the SS information.

In a possible implementation of the fourth aspect, the sub-bitstream data further includes resolution information.

It should be noted that for specific examples and implementations of the method or apparatus embodiments in the second aspect to the fourth aspect of this application, refer to related examples in the method embodiment in the first aspect. Details are not described herein again.

According to a fifth aspect, a media information processing apparatus is provided. The apparatus includes one or more processors and a memory. The memory is coupled to the one or more processors. The memory is configured to store computer program code, the computer program code includes an instruction, and when the one or more processors execute the instruction, the processing apparatus performs the media information processing method provided in any one of the first aspect or the possible implementations of the first aspect, or perform the media information processing method provided in the second aspect and any possible implementation of the second aspect.

According to a sixth aspect, a processor is provided. The processor is configured to perform the media information processing method according to any one of the first aspect or the possible implementations of the first aspect, or perform the media information processing method according to any one of the second aspect or the possible implementations of the second aspect.

According to still another aspect of this application, a computer-readable storage medium is provided. The computer-readable storage medium stores an instruction, and when the instruction is run on a device, the device is enabled to perform the media information processing method according to any one of the first aspect or the possible implementations of the first aspect.

According to still another aspect of this application, a computer-readable storage medium is provided. The computer-readable storage medium stores an instruction, and when the instruction is run on a device, the device is enabled to perform the media information processing method provided in any one of the second aspect or the possible implementations of the second aspect.

According to still another aspect of this application, a computer program product including an instruction is provided. When the computer program product runs on a computer, the computer is enabled to perform the media information processing method according to any one of the first aspect or the possible implementations of the first aspect.

According to still another aspect of this application, a computer program product including an instruction is provided. When the computer program product runs on a computer, the computer is enabled to perform the media information processing method according to any one of the second aspect or the possible implementations of the second aspect.

DESCRIPTION OF EMBODIMENTS

Figure 1:
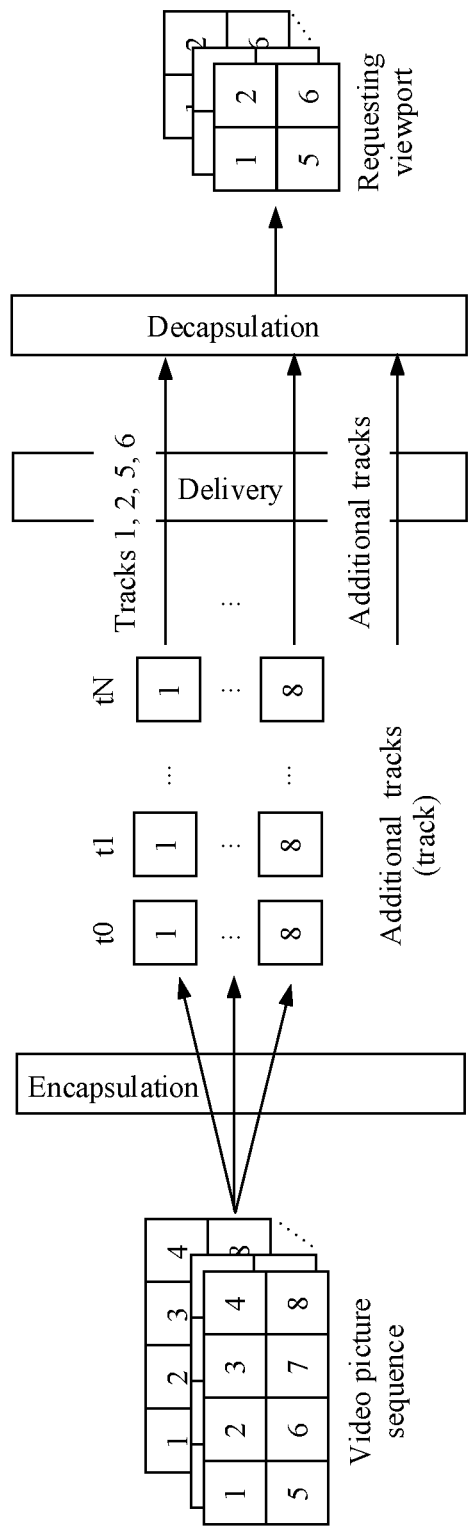
FIG. 1 is a schematic diagram of video coding and transmission of a sub-bitstream.

Prior to description of embodiments of this application, related technical terms in this application are first explained and described.

Video decoding is a processing process of restoring a bitstream to a reconstructed picture according to a specific syntax rule and processing method.

Video encoding is a processing process of compressing a picture sequence into a bitstream.

Video coding is an umbrella term of video encoding and video decoding. The translated Chinese term of video coding is the same as that of video encoding.

Panoramic video is also referred to as a VR panoramic video, or referred to as a 360-degree panoramic video or a 360-degree video, and is a video shot using a plurality of cameras in omnidirectional 360 degrees. When viewing the video, a user may randomly adjust a viewport of the user for viewing.

Tile is a square tile, in the High-Efficiency Video Coding (HEVC) video coding standard, obtained after a to-be-coded picture is split. A frame of picture may be split into a plurality of tiles, and the tiles jointly form the frame of picture. Each tile may be independently encoded.

Sub-picture is when a picture split to obtain a part of the original picture, and the part of the original picture is referred to as a sub-picture of the picture. In some embodiments, the sub-picture is square in shape. The sub-picture may be a part of a frame of picture.

A motion-constrained tile set (MCTS) is an encoding technology for tiles, and in this technology, a motion vector inside the tile is constrained during encoding such that tiles at a same location in a picture sequence do not refer to picture pixels outside the tile location in time domain. Therefore, each tile in time domain can be independently decoded.

Picture sub-region. For ease of description of this application, the picture sub-region is used as an umbrella term of tiles or sub-pictures. It may be understood that the sub-picture in this application may also include a picture split in a tile encoding scheme.

Track is defined in the ISO/IEC 14496-12 standard as a "timed sequence of related samples (q.v.) in an ISO base media file. Note: For media data, a track corresponds to a sequence of images or sampled audio, for hint tracks, a track corresponds to a streaming channel". Explanation is the track is a series of timed samples that are encapsulated in an ISO base media file format (ISOBMFF) encapsulation manner, for example, in a video track, a video sample is a bitstream generated after a video encoder encodes each frame, and each video sample is encapsulated according to the ISOBMFF standard to generate a sample.

Box is defined in the ISO/IEC 14496-12 standard as an "object-oriented building block defined by a unique type identifier and length. Note: Called 'atom' in some specifications, including the first definition of MP4." The box is a basic unit that constitutes an ISOBMFF file, and the box may include another box.

SEI is a type of a network abstract layer (NAL) unit (NALU) defined in a video coding standard (H.264, H.265).

A MPD is a document specified in the ISO/IEC 23009-1 standard. The document includes metadata that is used by a client to construct an HTTP-URL. The MPD includes one or more period elements. Each period element includes one or more adaptation sets. Each adaptation set includes one or more representations. Each representation includes one or more segments. The client selects the representation based on information in the MPD, and constructs an HTTP-URL of the segment.

The embodiments of this application are applied to a video coding and transmission system. In an embodiment, a block diagram of sub-bitstream-based video coding and transmission is shown in FIG. 2.

Figure 2:
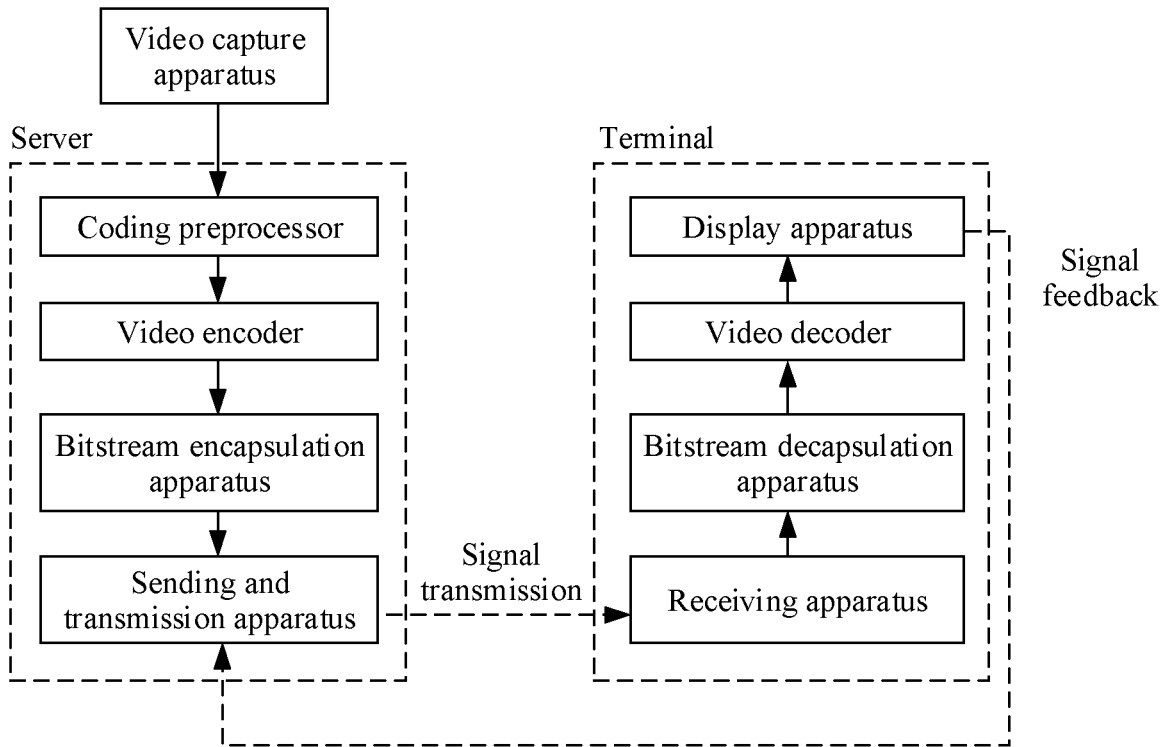
FIG. 2 is a schematic structural diagram of a video coding and transmission system according to an embodiment of this application.

Referring to FIG. 2, on a server side, a video or a picture is obtained by a video capture apparatus. The video capture apparatus may be a video or picture capture apparatus such as a camera, or may be a receiving apparatus that receives data of a video or a picture from another device. A coding preprocessor is configured to perform some coding preprocessing on the video or the picture. The coding preprocessor module may perform sub-region partitioning (or splitting) on the video or the picture. It may be understood that the coding preprocessor may alternatively be a part of a video encoder, or the video encoder performs the foregoing functions of the coding preprocessor. The video encoder is configured to encode the video or the picture according to a specific encoding rule. For example, a coding scheme specified in the H.264 or the H.265 may be used, or the video or the picture may be encoded based on another private encoding technology. For a coded bitstream, a bitstream encapsulation apparatus may perform bitstream encapsulation on the bitstream according to a specific encapsulation format. For example, the specific encapsulation format may be an encapsulation format of an Moving Picture Experts Group (MPEG)-2 transport stream (TS) or another encapsulation format. Then, a sending and transmission apparatus sends the encapsulated bitstream to a terminal.

On a terminal side, a receiving apparatus is configured to receive the bitstream from the server side, and then after a bitstream decapsulation apparatus decapsulates the bitstream, a plurality of sub-bitstreams may be obtained and sent to a video decoder. The video decoder decodes the sub-bitstreams, to generate a decoded video or picture, and finally the decoded video or picture is displayed by a display apparatus.

It may be understood that the server and the terminal shown in FIG. 2 are representations relative to a sender and a receiver of the bitstream. In an embodiment, the server may be a device such as a smartphone or a tablet computer, and the terminal may also be a device such as a smartphone or a tablet computer. This is not limited in this embodiment of this application.

It may be understood that the sub-bitstream in this embodiment of this application is described relative to a spliced bitstream. The obtained sub-bitstream may be a separately transmitted bitstream. The sub-bitstream in this embodiment of this application may also be referred to as sub-bitstream data, and the sub-bitstream and the sub-bitstream data may be replaced with each other.

Figure 3:
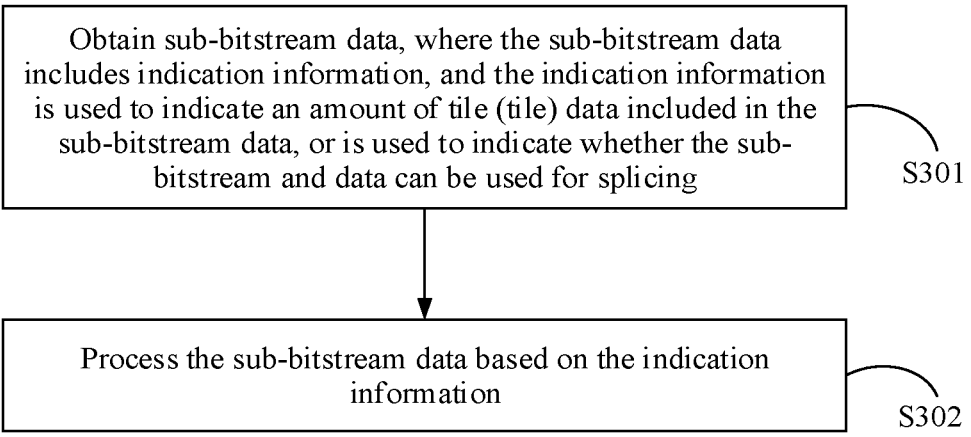
FIG. 3 is a schematic flowchart of a media information processing method according to an embodiment of this application.

As shown in FIG. 3, an embodiment of one aspect of this application provides a media information processing method S30. The method S30 includes the following steps.

S301. A terminal obtains sub-bitstream data, where the sub-bitstream data includes indication information, and the indication information is used to indicate an amount of tile data included in the sub-bitstream data.

S302. The terminal processes the sub-bitstream data based on the indication information.

Figure 4:
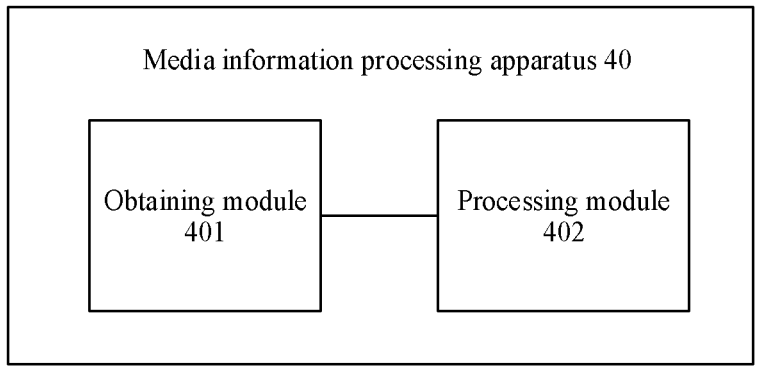
FIG. 4 is a schematic structural diagram of a media information processing apparatus according to an embodiment of this application.

As shown in FIG. 4, an embodiment of one aspect of this application provides a media information processing apparatus 40. The apparatus 40 includes an obtaining module 401 and a processing module 402. The obtaining module 401 is configured to obtain sub-bitstream data, where the sub-bitstream data includes indication information, and the indication information is used to indicate an amount of tile data included in the sub-bitstream data. The processing module 402 is configured to process the sub-bitstream based on the indication information.

Figure 5:
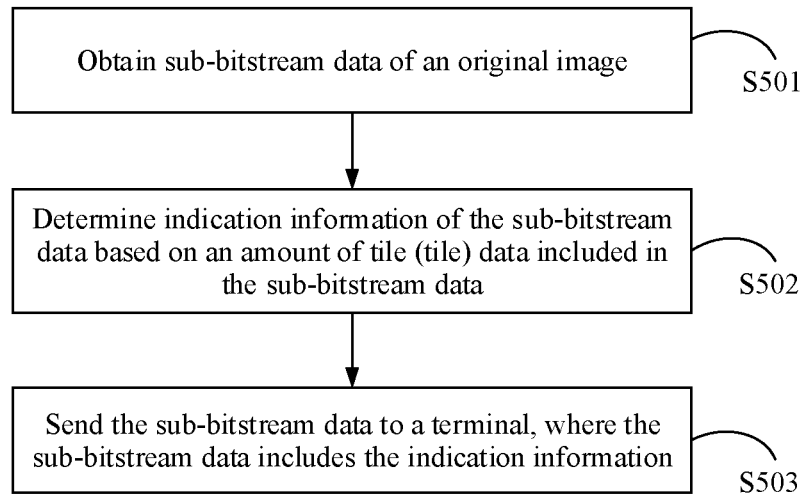
FIG. 5 is a schematic structural diagram of another media information processing method according to an embodiment of this application.

As shown in FIG. 5, an embodiment of one aspect of this application provides another media information processing method S50. The method S50 includes the following steps.

S501. A server obtains sub-bitstream data of an original image.

S502. The server determines indication information of the sub-bitstream data based on an amount of tile data included in the sub-bitstream data.

S503. The server sends the sub-bitstream data to a terminal, where the sub-bitstream data includes the indication information.

Figure 6:
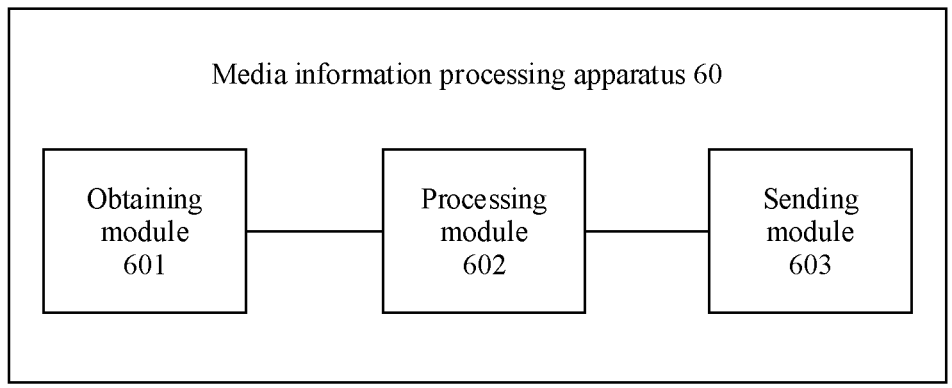
FIG. 6 is a schematic structural diagram of another media information processing apparatus according to an embodiment of this application.

As shown in FIG. 6, an embodiment of one aspect of this application provides a media information processing apparatus S60. The apparatus S60 includes an obtaining module 601, a processing module 602, and a sending module 603. The obtaining module 601 is configured to obtain sub-bitstream data of an original image. The processing module 602 is configured to determine indication information of the sub-bitstream data based on an amount of tile data included in the sub-bitstream data. The sending module 603 is configured to send the sub-bitstream data to a terminal, where the sub-bitstream data includes the indication information.

Figure 7:
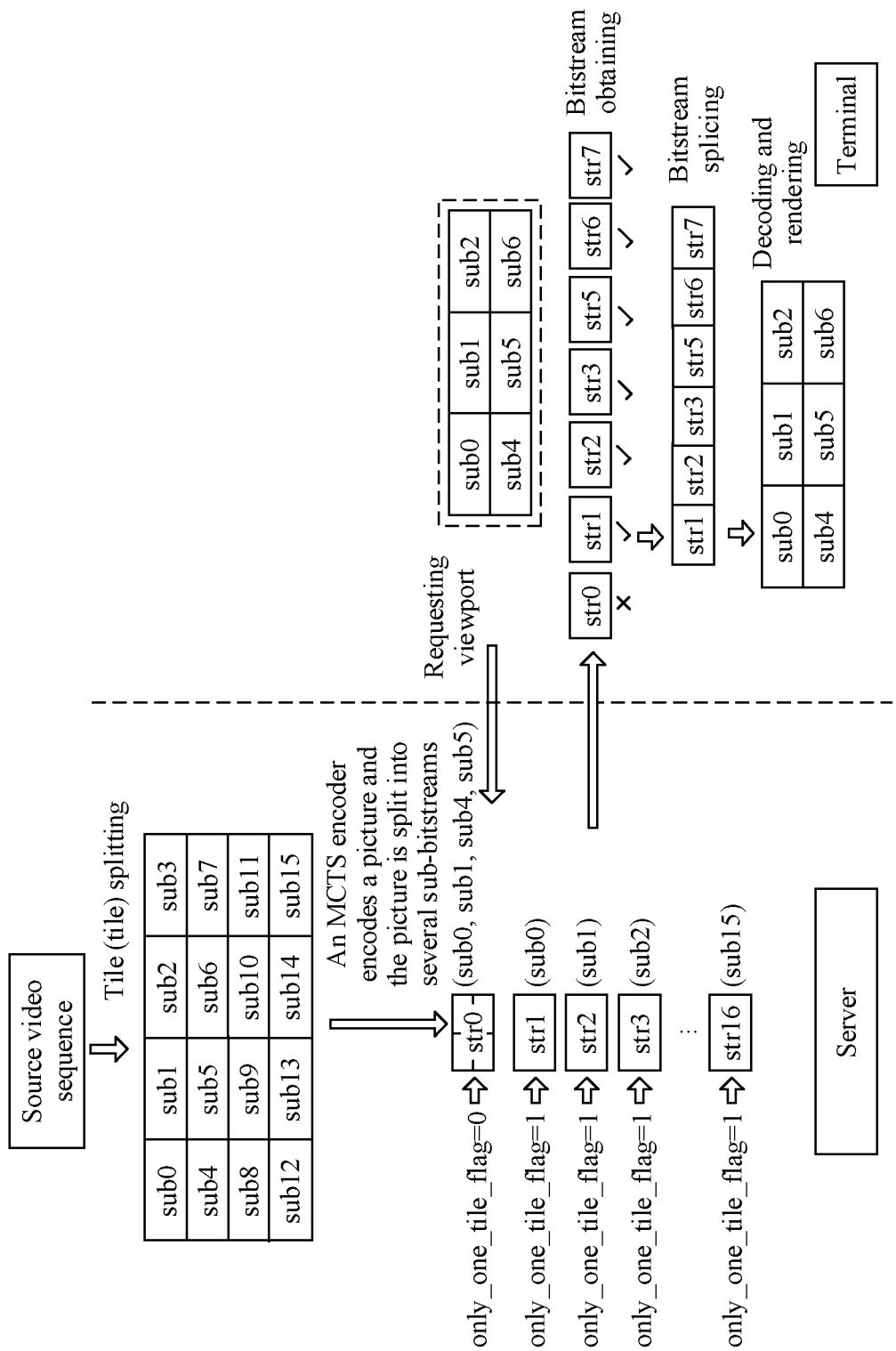
FIG. 7 is a schematic diagram of first bitstream splicing according to an embodiment of this application.

In a possible implementation of this application, an embodiment of this application provides a sub-bitstream-based splicing processing method, a corresponding encoding transmission manner, and a corresponding decoding presentation manner. An entire system processing process in this embodiment of this application is shown in FIG. 7, and implementation steps of the system processing process are described in detail as follows.

On a server side.

An input video picture (which may be referred to as an original image) is split into regions (each region may be referred to as a tile), and is encoded in an MCTS form, to generate a conforming video bitstream. The MCTS refers to limiting an inter-frame/intra-frame prediction motion vector in time domain and space domain, and a predicted pixel does not exceed a picture boundary. Setting when the server performs encoding in the MCTS form may include disabling cross-tile deblocking filtering and sample adaptive offset (SAO) filtering, to ensure independent decoding of tile data. Then, the server splits the video bitstream to obtain a plurality of sub-bitstreams. One sub-bitstream may include coded data of one tile, or may include coded data of a plurality of tiles. The coded data of the tile is coded data obtained after a tile in the original image is encoded. In this embodiment of this application, the coded data of the tile may also be referred to as tile data.

A process in which the server splits the video bitstream to obtain a plurality of sub-bitstreams may include detecting, by the server, a NALU start code in the video bitstream, and splitting the video bitstream into different NALUs, where each NALU includes one piece of tile data or a plurality of pieces of tile data, and determining, by the server, a coding parameter set corresponding to one or more pieces of tile data included in different NALUs (that is, determining a coding parameter set of a sub-bitstream), copying the tile data included in each NALU from the video bitstream, and adding a NALU start code to the copied tile data and the coding parameter set. In this way, a sub-bitstream is formed.

A header type in each NALU may be used to indicate coding parameter set information of the video bitstream and tile data included in the NALU. The coding parameter set may include VPS information, SPS information, PPS information, SS information, and the like.

For ease of understanding, it is assumed herein that a resolution of an original image is 3840×1920, a size of each split tile is 640×640, and one NALU (that is, one sub-bitstream) in the video bitstream is used as an example for detailed description. When the server determines a coding parameter set of the sub-bitstream, the server may continue to use the coding parameter set in the video bitstream, and modify only some parameters in the coding parameter set. Details are as follows.

For the VPS information, optionally, because a resolution of the sub-bitstream decreases, the server may modify an encoding specification level set in the VPS information, for example, change a level from 5.1 to 4.1.

For the SPS information, the server may modify parameters indicating a picture width and a picture height in the SPS information, that is, pic_width_in_luma_samples and pic_height_in_luma_sample. For example, when an amount of the tile data included in the sub-bitstream is 1 (that is, a sub-picture corresponding to the sub-bitstream includes one tile), values of pic_width_in_luma_samples and pic_height_in_luma_samples are 640 and 640 respectively. When an amount of the tile data included in the sub-bitstream is 2 (that is, a sub-picture corresponding to the sub-bitstream includes two tiles), if the two tiles are adjacent to each other on the left and right, values of pic_width_in_luma_samples and pic_height_in_luma_samples are 1280 and 640 respectively. If the two tiles are adjacent to each other on the top and bottom, values of pic_width_in_luma_samples and pic_height_in_luma_samples are 640 and 1280 respectively.

For the PPS information, the server may set tile splitting related parameters such as tiles_enabled_flag (a tile enabled flag), num_tile_columns_minus1 (a tile column number flag), num_tile_rows_minus1 (a tile row number flag), and uniform spacing flag (a uniform spacing flag) in the PPS information based on the amount of the tile data included in the sub-bitstream (that is, a quantity of tiles included in the sub-picture corresponding to the sub-bitstream). For example, when the sub-picture corresponding to the sub-bitstream includes one tile, a value of tiles_enabled_flag is set to 0. When the sub-picture corresponding to the sub-bitstream includes two tiles that are adjacent to each other on the left and right and have a same resolution, a value of tiles_enabled_flag is set to 1, a value of num_tile_columns_minus1 may be set to 1, a value of num_tile_rows_minus1 may be set to 0, and a value of uniform_spacing_flag may be set to 1.

Figure 8:
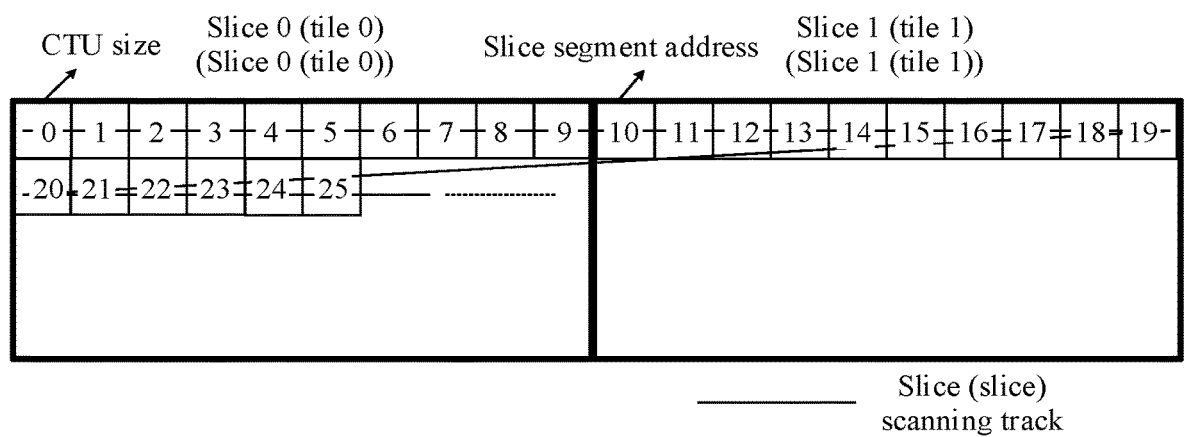
FIG. 8 is a schematic diagram of slice arrangement in a bitstream according to an embodiment of this application.

For the SS information, the server may construct in a splitting manner of using each piece of tile data included in the sub-bitstream as a slice, and the server may set header information in an SS parameter, such as first_slice_segment_in_pic_flag (a first SS flag) and slice_segment_address (a SS address). For example, when the sub-bitstream includes one piece of tile data, a value of first_slice_segment_in_pic flag may be set to 1, and a value of slice_segment_address may be set to 0. When the sub-bitstream includes two pieces of tile data, and a first tile of each frame is used as a first slice, a value of corresponding first_slice_segment_in_pic_flag is set to 1, a value of slice_segment_address is set to 0, and a second tile of each frame is used as a second slice, a value of corresponding first_slice_segment_in_pic_flag is set to 1, and a value of slice_segment_address is set to 10 (as shown in FIG. 8, a picture is split into 64×64 coding tree units (CTUs), the entire picture is scanned in a zig-zag manner, and a first CTU label of a current slice is the value of slice_segment_address of the current slice).

It should be noted that the server may alternatively construct in a splitting manner of using every two pieces of tile data or more than two pieces of tile data as a slice. In this embodiment of this application, only a splitting manner in which one piece of tile data is used as a slice is used for description, and this does not constitute a limitation on this embodiment of this application.

In this embodiment of this application, the server may write information about an amount of tile data included in a sub-bitstream into an SEI message of a bitstream. The information about the amount of the tile data may be used to indicate whether the sub-bitstream can be used for splicing. When the amount of the tile data is 1, the information may be used to indicate that the sub-bitstream can be used for splicing. When the amount of the tile data is greater than 1, the information may be used to indicate that the sub-bitstream cannot be used for splicing. The SEI message may be represented using the following syntax elements.

TABLE 1.1

| SEI syntax | |
|---|---|
| sei_payload( payloadType, payloadSize ) { | Descriptor |
| if( nal_unit_type = = PREFIX_SEI_NUT ) | |
| if( payloadType = = 0 ) | |
| buffering_period( payloadSize ) | |
| ... | |
| else if( payloadType = = 156) | |
| sub_picture_info_aggregate ( payloadSize ) | |
| ... | |
| else if( payloadType = = 160 ) | |
| layers_not_present( payloadSize ) /* specified in Annex F */ | |
| } | |
| } | |

TABLE 1.2

| SEI message syntax for sub-bitstream splicing | |
|---|---|
| sub_picture_info_aggregate ( payloadSize ) { | Descriptor |
| sub_pic_str_only_one_tile | u(1) |
| } | |

In Table 1.1, a new type 156 is added for an SEI type and is used to indicate whether a current sub-bitstream can be used for splicing, and information sub_picture_info_aggregate (payloadSize) is added. Meanings of syntax elements included in sub_picture_stream_aggregate are as follows.

The sub_pic_str_only_one_tile comprises a value 1 which indicates that the sub-bitstream includes no more than one piece of tile data (that is, a sub-picture corresponding to the sub-bitstream includes no more than one tile), and a value 0 indicates that the sub-bitstream includes two or more than two pieces of tile data (that is, a sub-picture corresponding to the sub-bitstream includes two or more tiles).

TABLE 1.3

| SEI message syntax for an amount of tile data included in a sub-bitstream | |
|---|---|
| sub_picture_info_aggregate ( payloadSize ) { | Descriptor |
| Tile_num_subpicture | ue(v) |
| } | |

Alternatively, the SEI may be a type in Table 1.3, and a value of Tile_num_subpicture indicates the amount of the tile data included in the sub-bitstream.

A specific method for obtaining a plurality of sub-bitstreams is as follows, but this application is not limited to this method.

1. Perform tile splitting on an original image, and encode a split tile, to obtain a video bitstream.

2. Obtain each NALU in the video bitstream, and parse a coding parameter set (including VPS information, SPS information, PPS information, and SS information) of the video bitstream and make coding parameter sets of a plurality of sub-bitstreams based on the tile data included in each NALU and the coding parameter set of the video bitstream.

3. Copy coded data of each sub-bitstream in the plurality of sub-bitstreams from the video bitstream, and form the plurality of sub-bitstreams based on the coding parameter sets of the plurality of sub-bitstreams.

4. Set an SEI message sub_picture_info_aggregate for each sub-bitstream.

Then, each sub-bitstream may be encapsulated and stored in a server.

On a terminal side.

Based on user behavior, a terminal requests a required bitstream from the server, and decapsulates the received bitstream.

An SEI message sub_picture_info_aggregate (payloadSize) of each sub-bitstream is parsed, and whether each sub-bitstream can be used for bitstream splicing are determined based on values of the syntax elements in Table 1.1 and Table 1.2. That a value of sub_pic_str_only_one_tile is 1 indicates that the sub-bitstream can be used for splicing. That a value of sub_pic_str_only_one_tile is not 1 indicates that the sub-bitstream cannot be used for splicing, therefore, the sub-bitstream is discarded and is not involved in subsequent processing. Sub-bitstreams whose sub_pic_str_only_one_tile values are 1 are spliced. Optionally, if sub-bitstreams requested to be downloaded are not enough to be spliced into a complete rectangle, one of the sub-bitstreams may be copied and filled, and the copied sub-bitstream may not participate in decoding, rendering, and displaying.

For example, in FIG. 7, sub0 to sub15 are 16 tiles of a video picture, str0 is a sub-bitstream obtained after four tiles such as sub0, sub1, sub4, and sub5 are encoded, and str1 to str16 are respectively sub-bitstreams obtained after sub0 to sub15 are encoded (that is, each sub-bitstream includes one tile). Correspondingly, that a value of only_one_tile_flag corresponding to the sub-bitstream str0 is equal to 0, and that values of only_one_tile_flag corresponding to the sub-bitstreams str1, str2, str3, str5, str6, and str7 are all equal to 1 indicates that str0 cannot be used for splicing (x in FIG. 7 indicates that str0 cannot be used for splicing), and str1, str2, str3, str5, str6, and str7 can be used for splicing (√ in FIG. 7 indicates that str1, str2, str3, str5, str6, and str7 cannot be used for splicing). A process of splicing sub-bitstreams by the terminal is described in detail.

The terminal detects NALU start codes in the sub-bitstreams str1, str2, str3, str5, str6, and str7, and splits the sub-bitstreams into different NALUs, determine a coding parameter set and coded data of each sub-bitstream according to a header type in an NALU. The terminal may select one of the sub-bitstreams str1, str2, str3, str5, str6, and str7 as a reference for constructing a coding parameter set. For example, the terminal selects str1 as a reference for constructing a coding parameter set, and determines a coding parameter set of a new bitstream (that is, a conforming bitstream spliced by sub-bitstreams) based on coding parameter set information of str1. Then, coded data of a corresponding tile is copied from the sub-bitstreams str1, str2, str3, str5, str6, and str7 respectively as coded data of a position corresponding to a tile of the new bitstream, the NALU start codes are added to the coding parameter set of the new bitstream and the coded data of the new bitstream, and the coded data is spliced into a conforming bitstream in a certain sequence.

For ease of understanding, it is assumed herein that a resolution of an original image is 3840×1920, and a size of each split tile is 640×640. When determining the coding parameter set (for example, including VPS information, SPS information, PPS information, and SS information) of the new bitstream, the terminal may continue to use the coding parameter set of str1, and modify only some parameters in the coding parameter set. Details are as follows.

For the VPS information, optionally, because a resolution of the new bitstream increases, the terminal may modify an encoding specification level set in the VPS information, for example, change a level from 4.1 to 5.1.

For the SPS information, the terminal may modify parameters indicating a picture width and a picture height in the SPS information, that is, pic_width_in_luma_samples and pic_height_in_luma_sample. For example, in FIG. 7, if a sub-picture requested by the terminal includes 3×2 tiles (that is, sub0 to sub2 and sub4 to sub6), values of pic_width_in_luma_samples and pic_height_in_luma_samples are 1920 (that is, 640×3) and 1280 (that is, 640×2) respectively.

For the PPS information, the terminal may set tile splitting related parameters such as tiles_enabled_flag (a tile enabled flag), num_tile_columns_minus1 (a tile column number flag), num_tile_rows_minus1 (a tile row number flag), and uniform_spacing_flag (a uniform spacing flag) in the PPS information based on a quantity of tiles included in the sub-picture. For example, in FIG. 7, if the sub-picture requested by the terminal includes 3×2 tiles, the terminal may set a value of tiles_enabled_flag to 1, set a value of num_tile_columns_minus1 to 2 (the sub-picture includes three columns and the three columns are represented by starting from 0), set num_tile_rows_minus1 to 1 (the sub-picture includes two rows and the two rows are represented by starting from 0), and set a value of uniform_spacing_flag to 1 (that is, the tiles are uniformly spaced).

Figure 9:
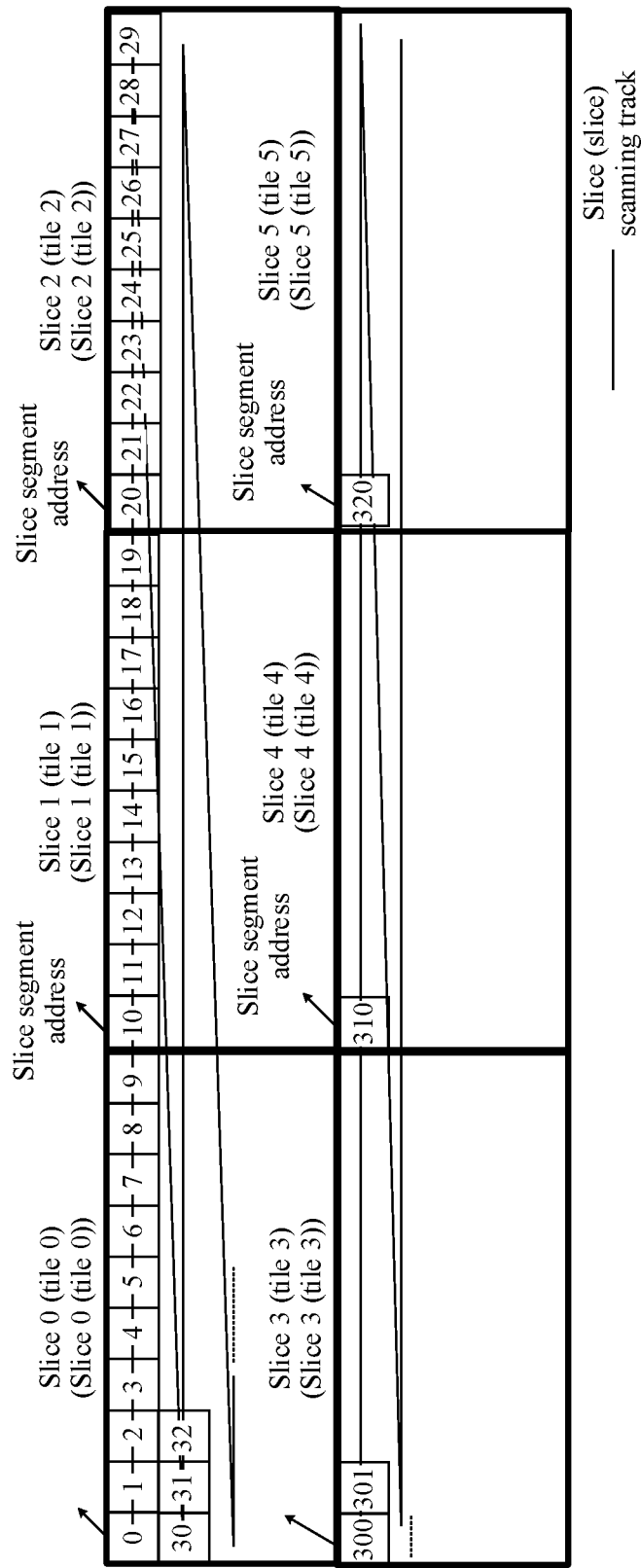
FIG. 9 is a schematic diagram of slice arrangement in another bitstream according to an embodiment of this application.

For the SS information, the terminal may construct in a splitting manner of using each piece of tile data included in each sub-bitstream as a slice, and the terminal may set header (header) information in an SS parameter, such as first_slice_segment_in_pic_flag (a first SS flag) and slice_segment_address (a SS address). For example, in an arrangement form in FIG. 7, a value of first_slice_segment_in_pic_flag in the header information in the SS parameter of str1 of each frame is set to 1, and other values of first_slice_segment_in_pic_flag are set to 0. A value of slice_segment_address corresponding to the coded data of str1, str2, str3, str5, str6, and str7 in the header information in the SS parameter of each frame can be determined through calculation, and values of slice_segment_address in FIG. 7 are respectively set to 0, 10, 20, 300, 310, and 320 (as shown in FIG. 9, a picture is split into 64×64 CTUs, the entire picture is scanned in a zig-zag manner, and a first CTU label of a current slice is the value of slice_segment_address of the current slice).

Figure 10:
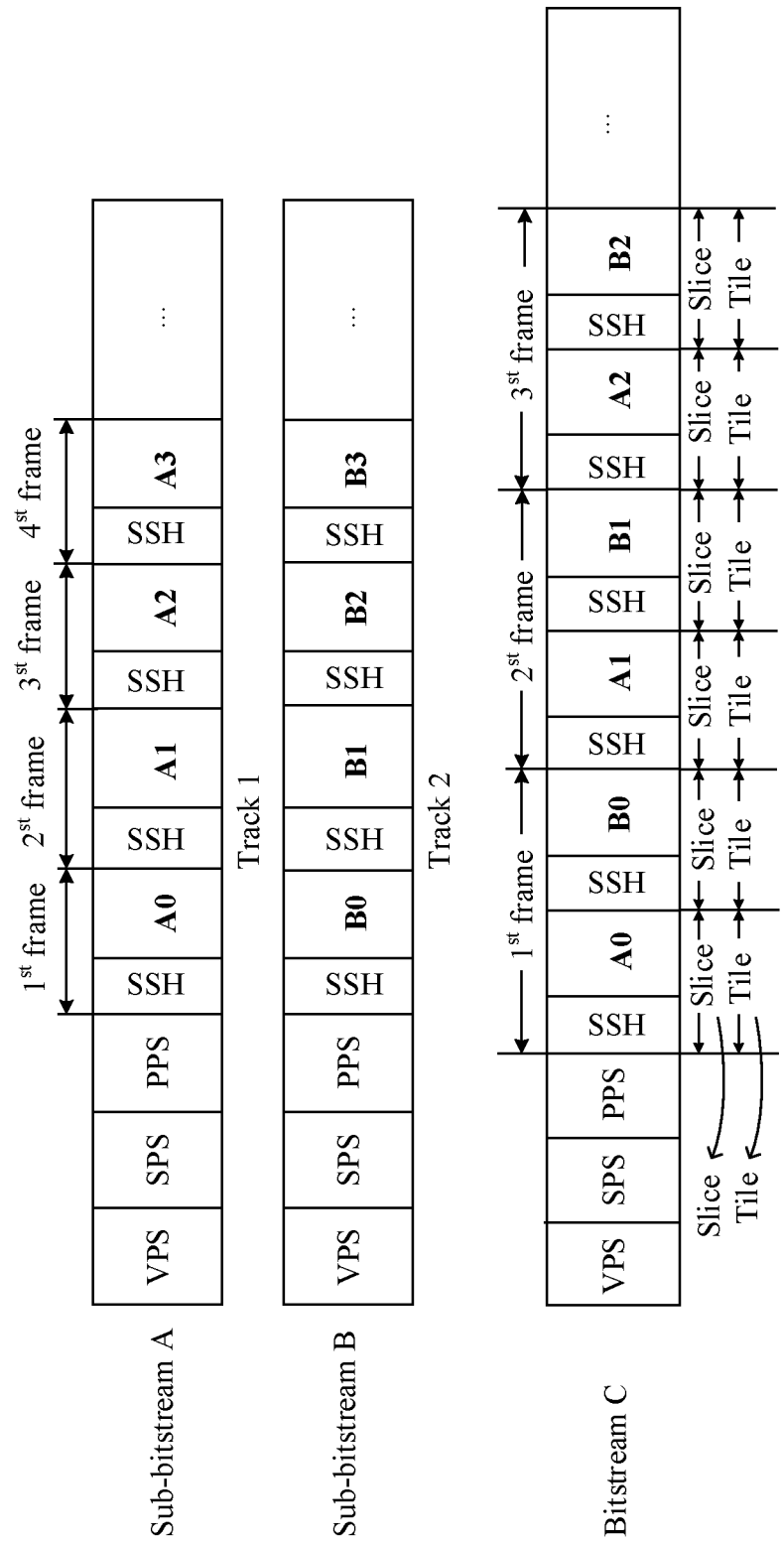
FIG. 10 is a schematic diagram of second bitstream splicing according to an embodiment of this application.

For example, as shown in FIG. 10, assuming that a first sub-bitstream is A, a second sub-bitstream is B, the sub-bitstream A includes data of four frames (that is, A0 to A3) and the data is encapsulated in a track 1, the sub-bitstream B also includes data of four frames (B0 to B3) and the data is encapsulated in a track 2, a bitstream structure obtained after the substream A and the substream B are spliced may be shown as a bitstream C in FIG. 10. SS header (SSH) indicates the header information in the SS parameter.

A specific method for splicing a plurality of sub-bitstreams is as follows, but this application is not limited to this method.

1. Parse an SEI message of sub_picture_info_aggregate of each sub-bitstream, obtain an amount of tile data included in each sub-bitstream, and determine a sub-bitstream whose amount of tile data is 1 as a sub-bitstream that can be used for splicing.

2. Parse a parameter set (including VPS information, SPS information, PPS information, and SS information) of each sub-bitstream, combine width and height information of a decoded picture, and make a new coding parameter set as a coding parameter set of a new bitstream (a spliced bitstream).

3. Copy, based on a location of a tile in the decoded picture, coded data of a corresponding tile in each substream that can be used for splicing, add NALU start codes to the copied coded data and a new coding parameter set, and splice the coded data and the new coding parameter set into a conforming bitstream in a specific sequence, to obtain the spliced bitstream.

Finally, the terminal decodes the spliced bitstream, and renders and displays the spliced bitstream on a display device.

It should be noted that the server may also add, to each sub-bitstream, indication information indicating whether the sub-bitstream can be used for splicing. Correspondingly, after obtaining the sub-bitstream, the terminal may directly determine, based on the indication information, whether the sub-bitstream can be used for splicing. When the indication information is used to indicate whether the sub-bitstream can be used for splicing, or the indication information is used to indicate an amount of tile data included in the sub-bitstream, in a specific implementation process of the server side and the terminal side, only content of added and obtained indication information is different, other corresponding operation processes are the same, and details are not described herein in this embodiment of this application.

In this embodiment of this application, tile encoding is performed on an original image to obtain a video bitstream, a plurality of sub-bitstreams are obtained from the video bitstream, and information about the amount of the tile data included in the sub-bitstream or about whether the sub-bitstream can be used for splicing is added to each sub-bitstream such that the terminal can determine sub-bitstreams that can be used for splicing, and a plurality of sub-bitstreams that can be used for splicing are spliced. After a required bitstream is spliced and then decoded, only a single decoder is required to implement decoding in a sequence of a plurality of sub-pictures, and no additional track information needs to be transmitted, thereby saving bandwidth and simplifying complexity of system layer stream management.

Figure 11:
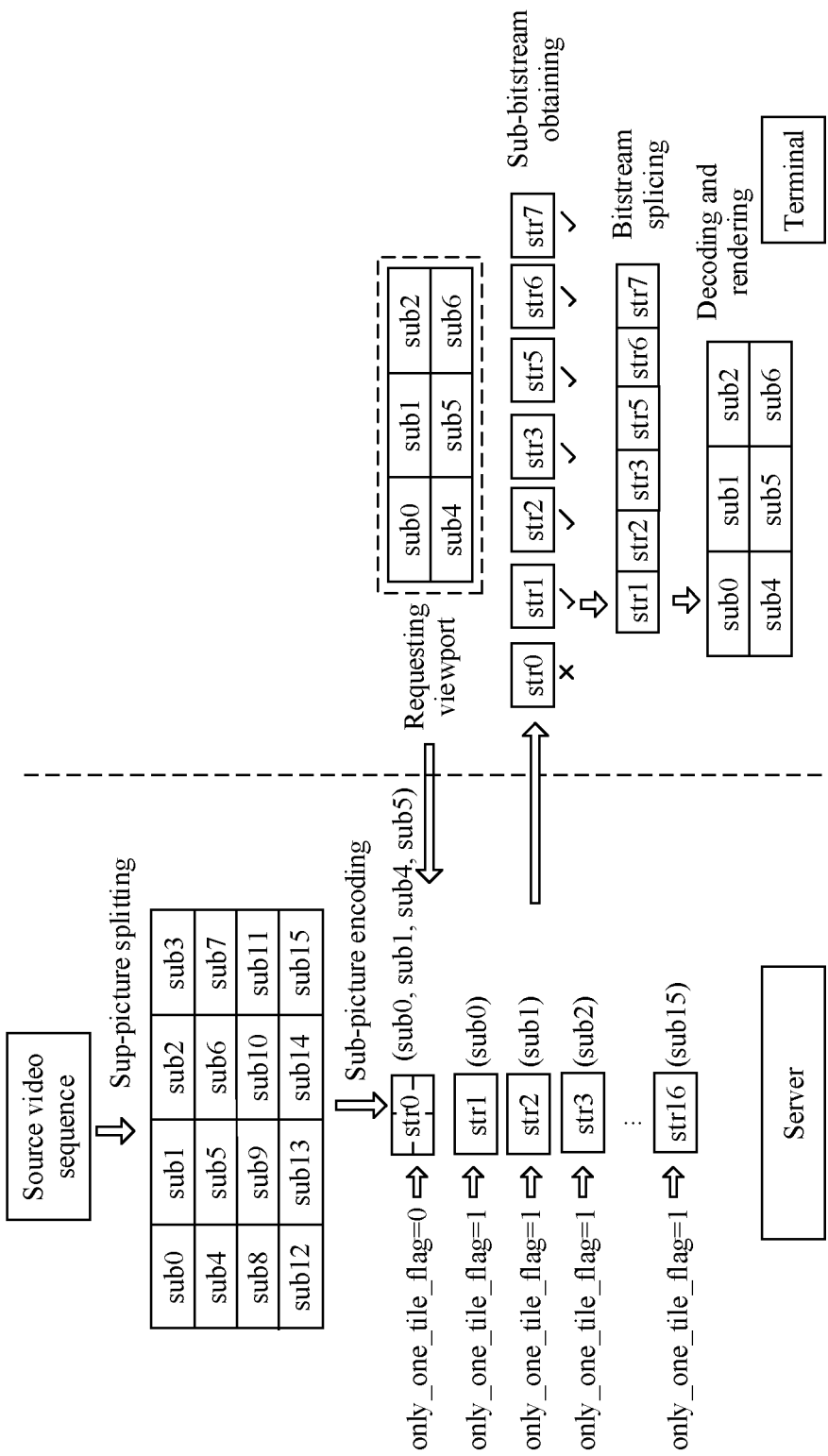
FIG. 11 is a schematic diagram of third bitstream splicing according to an embodiment of this application.

In a possible implementation of this application, an embodiment of this application provides another sub-bitstream-based splicing processing method, a corresponding encoding transmission manner, and a corresponding decoding presentation manner. An entire system processing process in this embodiment of this application is shown in FIG. 11, and implementation steps of the system processing process are described in detail as follows.

On a server side.

An input video picture is split into sub-pictures, and each sub-picture is encoded, to generate a plurality of sub-bitstreams. For example, the original image may be split according to a same width and a same height (herein, it means that widths and heights of different sub-pictures obtained after splitting are the same, instead of that widths and heights of a same sub-picture are the same, and widths and heights of a same sub-picture may be the same or may be different), to obtain a plurality of square sub-pictures. When a sub-picture is encoded, a predicted motion vector limitation may be performed on the sub-picture such that a predicted pixel of the sub-picture does not exceed one or some boundaries of four boundaries of the sub-picture. For each sub-picture bitstream, the information about the amount of the tile data included in the sub-bitstream may be written into the SEI message of the sub-bitstream in the manner in the foregoing embodiment. A syntax element is the same as that in the foregoing embodiment. For details, refer to descriptions of syntax elements in the foregoing embodiment. Details are not described herein again in this application.

Therefore, for each sub-bitstream, sub_pic_str_only_one_tile a value 1 indicates that the sub-bitstream includes no more than one piece of tile data (that is, a sub-picture corresponding to the sub-bitstream includes no more than one tile), and a value 0 indicates that the sub-bitstream includes two or more than two pieces of tile data (that is, a sub-picture corresponding to the sub-bitstream includes two or more tiles).

For example, in FIG. 11, sub0 to sub15 are 16 tiles of a video picture, str0 is a sub-bitstream obtained after sub-pictures of four tiles such as sub0, sub1, sub4, and sub5 are encoded, and str1 to str16 are respectively sub-bitstreams obtained after sub-pictures sub0 to sub15 are encoded (that is, each sub-picture includes one tile). Correspondingly, a value of only_one_tile_flag corresponding to str0 is equal to 0, and values of only_one_tile_flag corresponding to str1 to str16 are all equal to 1. In FIG. 11, x is used to indicate that the sub-bitstreams cannot be used for splicing, and √ is used to indicate that the sub-bitstreams can be used for splicing.

Then, each sub-bitstream is encapsulated and stored in a server.

It should be noted that, a difference between this embodiment and the foregoing embodiment lies in that, in the foregoing embodiment, the server side performs tile encoding on an original image, only one encoder is required, one video bitstream is obtained after the encoding, and a plurality of sub-bitstreams need to be re-obtained from the video bitstream, however, in this embodiment, the server side splits an original image into sub-pictures, each sub-picture is encoded by an independent encoder, and the coded bitstream is a plurality of sub-bitstreams.

In addition, a method for requesting, by a terminal side, a bitstream from a server, de-capsulating the bitstream, and splicing a plurality of substreams is consistent with the process in the foregoing embodiment. For details, refer to the descriptions in the foregoing embodiment. Details are not described in this embodiment of this application again.

In this embodiment of this application, sub-picture splitting is performed on an original image, and each sub-picture is encoded to obtain a plurality of sub-bitstreams. Information about an amount of tile data included in each sub-bitstream is added to each sub-bitstream such that the terminal can determine sub-bitstreams that can be used for splicing, and a plurality of sub-bitstreams that can be used for splicing are spliced. After a required bitstream is spliced and then decoded, only a single decoder is required to implement decoding in a sequence of a plurality of sub-pictures, and no additional track information needs to be transmitted, thereby saving bandwidth and simplifying complexity of stream management.

In a possible implementation of this application, if there are sub-bitstreams with different resolutions in a server, the sub-bitstreams may be spliced in a manner that a tile includes a plurality of slices. An implementation process on the server side is consistent with the process in the foregoing embodiment. On the terminal side, when sub-bitstreams that can be used for splicing are obtained and the sub-bitstreams can be spliced, a plurality of low-resolution sub-bitstreams may be used as slices to form one piece of tile data. In other words, one piece of tile data in the spliced bitstream may include a plurality of slices. For example, if the server includes sub-bitstreams with two resolutions and same content, and the two resolutions are respectively 1024×1024 and 512×512, the terminal may use two 512×512 sub-bitstreams as slices to form tile data.

Figure 12:
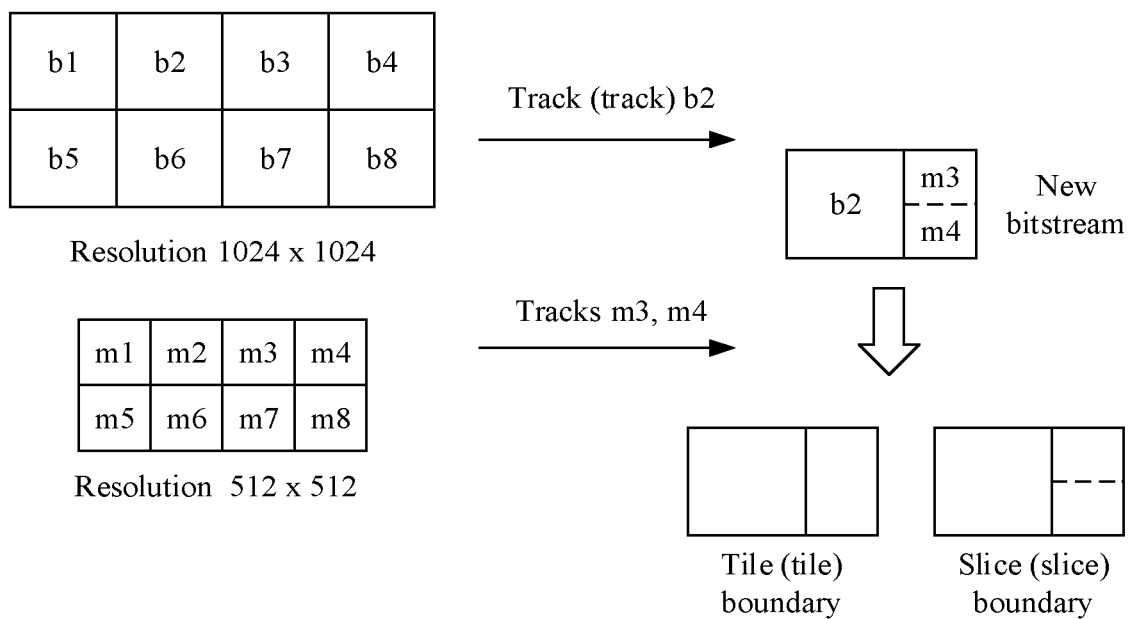
FIG. 12 is a schematic diagram of fourth bitstream splicing according to an embodiment of this application.

For example, as shown in FIG. 12, sub-bitstreams with a resolution of 1024×1024 include b1 to b8, and sub-bitstreams with a resolution of 512×512 include m1 to m8. A process of splicing the sub-bitstreams by the terminal is described in detail using the sub-bitstreams b2, m3, and m4 as an example. The terminal detects NALU start codes in the sub-bitstreams b2, m3, and m4, and splits the sub-bitstreams into different NALUs, determine a coding parameter set and coded data of each sub-bitstream according to a header type in an NALU. The terminal may select one of the sub-bitstreams b2, m3, and m4 as a reference for constructing a coding parameter set. For example, the terminal selects b2 as a reference for constructing a coding parameter set, and determines a coding parameter set of a new bitstream (that is, a conforming bitstream spliced by sub-bitstreams) based on coding parameter set information of b2. Then, coded data of a corresponding tile is copied from the sub-bitstreams b2, m3, and m4 respectively as coded data of a position corresponding to a tile of the new bitstream, the NALU start codes are added to the coding parameter set of the new bitstream and the coded data of the new bitstream, and the coded data is spliced into a conforming bitstream in a certain sequence.

When determining the coding parameter set (for example, including VPS information, SPS information, PPS information, and SS information) of the new bitstream, the terminal may continue to use the coding parameter set of b2, and modify only some parameters in the coding parameter set. Details are as follows.

For the VPS information, optionally, because a resolution of the new bitstream increases, the terminal may modify a coding specification level set in the VPS information, for example, change a level from 4.1 to 5.1.

For the SPS information, the terminal may modify parameters indicating a picture width and a picture height in the SPS information, that is, pic_width_in_luma_samples and pic_height_in_luma_sample. For example, for width and height information of the decoded picture in FIG. 12, values of pic_width_in_luma_samples and pic_height_in_luma_samples may be set to 1536 (that is, 1024+512) and 1024 respectively.

For the PPS information, the terminal may set tile splitting related parameters such as tiles_enabled_flag (a tile enabled flag), num_tile_columns_minus1 (a tile column number flag), num_tile_rows_minus1 (a tile row number flag), uniform_spacing_flag (a uniform spacing flag), and column_width_minus1[i] (a column sequence number flag) in the PPS information based on a quantity of tiles included in the decoded picture, where i ranges from 0 to (num_tile_columns_minus1)−1, and when a value of num_tile_columns_minus1 is 0, there is no column_width_minus1[i]. For example, in FIG. 12, the terminal may set a value of tiles_enabled_flag to 1, set a value of num_tile_columns_minus1 to 1, set num_tile_rows_minus1 to 0, set a value of uniform_spacing_flag to 0 (that is, tiles are not evenly allocated), and a value of set column_width_minus1[0] to 16.

For the SS information, the terminal may use a plurality of low-resolution sub-bitstreams as slices to form one piece of tile data, and splice the tile data with high-resolution tile data. Each piece of tile data is constructed in a slice splitting manner. The terminal may set SS parameters such as header information first_slice_segment_in_pic_flag (a first SS flag) and slice_segment_address (a SS address). For example, in an arrangement form in FIG. 12, a value of first_slice_segment_in_pic_flag in the header information in the SS parameter of b2 of each frame is set to 1, and other values of first_slice_segment_in_pic_flag are set to 0. A value of slice_segment_address corresponding to the coded data of b2, m3, and m4 in the header information of the SS parameter of each frame can be determined through calculation, and values of slice_segment_address in FIG. 12 are respectively set to 0, 16, and 208.

Figure 13:
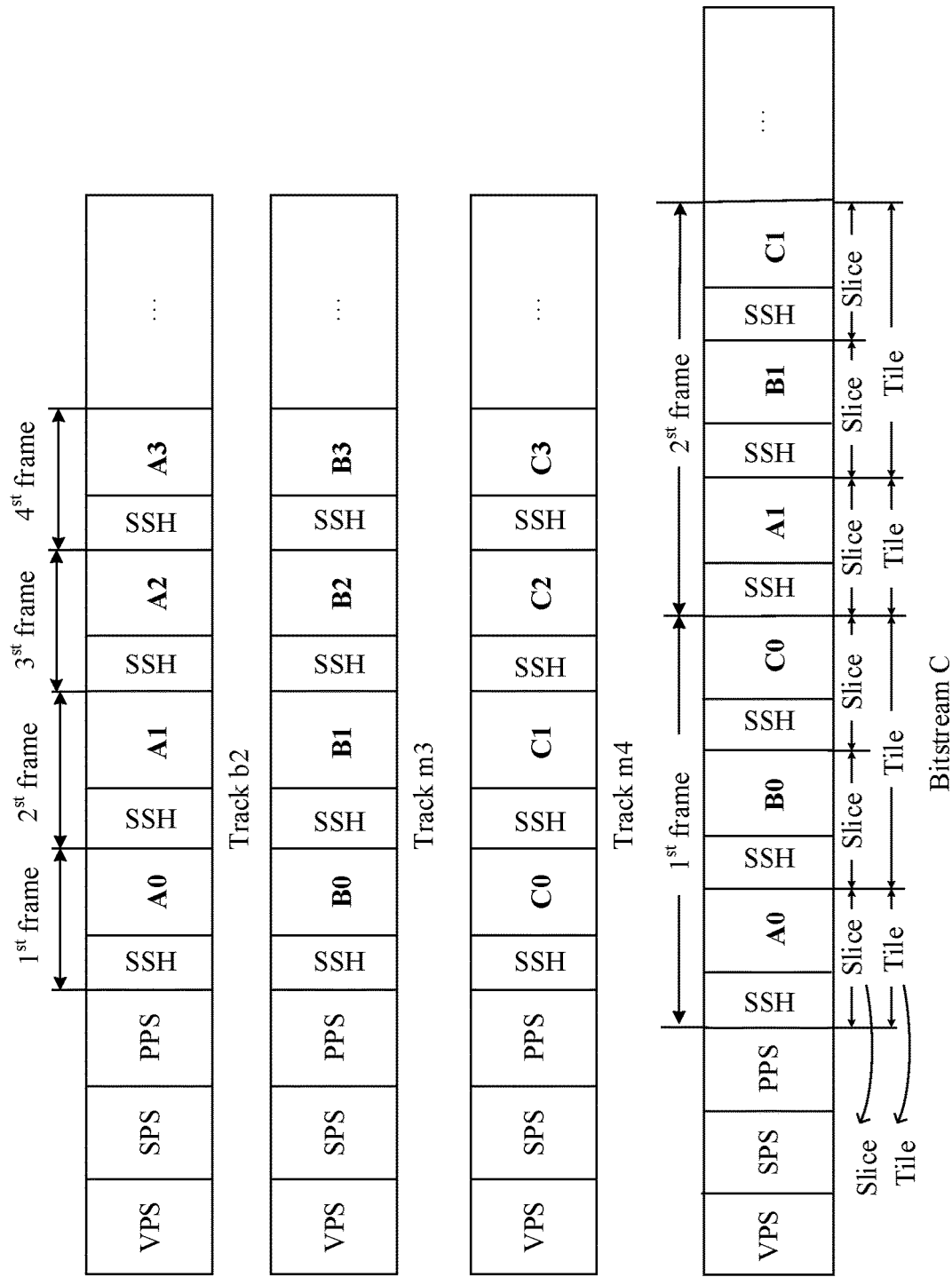
FIG. 13 is a schematic diagram of fifth bitstream splicing according to an embodiment of this application.

For example, as shown in FIG. 13, it is assumed that a sub-bitstream of 1024×1024 is b2, two sub-bitstreams of 512×512 are m3 and m4 respectively, and the sub-bitstream b2 includes four frames of data (that is, A0 to A3) and is encapsulated in a track b2, the sub-bitstreams m3 and m4 also include four frames of data (B0 to B3) and are encapsulated in a track m3 and a track m4, a bitstream structure obtained after the sub-bitstreams b2, m3, and m4 are spliced may be shown as a bitstream C in FIG. 13. SSH indicates the header information in the SS parameter.

In this embodiment of this application, information about an amount of tile data included in the sub-bitstream is added to a sub-bitstream such that the terminal can determine sub-bitstreams that can be used for splicing. In addition, when the sub-bitstreams that can be used for splicing include a plurality of different resolutions, a plurality of low-resolution sub-bitstreams may be used as slices to form one piece of tile data, and the tile data may be spliced with high-resolution tile data such that splicing between a plurality of sub-bitstreams with different resolutions can be implemented.

Optionally, the terminal side may also request the server side to download all bitstreams, select a required bitstream on the terminal side based on user behavior, and decapsulate the bitstream. Then, according to the bitstream splicing method provided in the foregoing embodiment, sub-bitstreams are spliced to obtain a conforming bitstream.

In another possible implementation of this application, this embodiment is an extension of adding the information about the amount of the tile data included in the sub-bitstream to the SEI message in the foregoing embodiment, and makes some changes to a processing manner of sub-bitstreams that cannot be used for splicing.

On a terminal side.

Based on user behavior, a terminal requests a required bitstream from the server, and decapsulates the received bitstream.

An SEI message sub_picture_info_aggregate (payloadSize) of each sub-bitstream is parsed, and whether each sub-bitstream can be used for bitstream splicing are determined based on values of the syntax elements in Table 1.1 and Table 1.2. That a value of sub_pic_str_only_one_tile is 1 indicates that the sub-bitstream can be used for splicing. That a value of sub_pic_str_only_one_tile is not 1 indicates that the sub-bitstream cannot be used for splicing, the sub-bitstream is directly decoded, and picture splicing is performed on a decoded picture and a picture obtained after a spliced bitstream is decoded, to obtain a final display picture.

Figure 14:
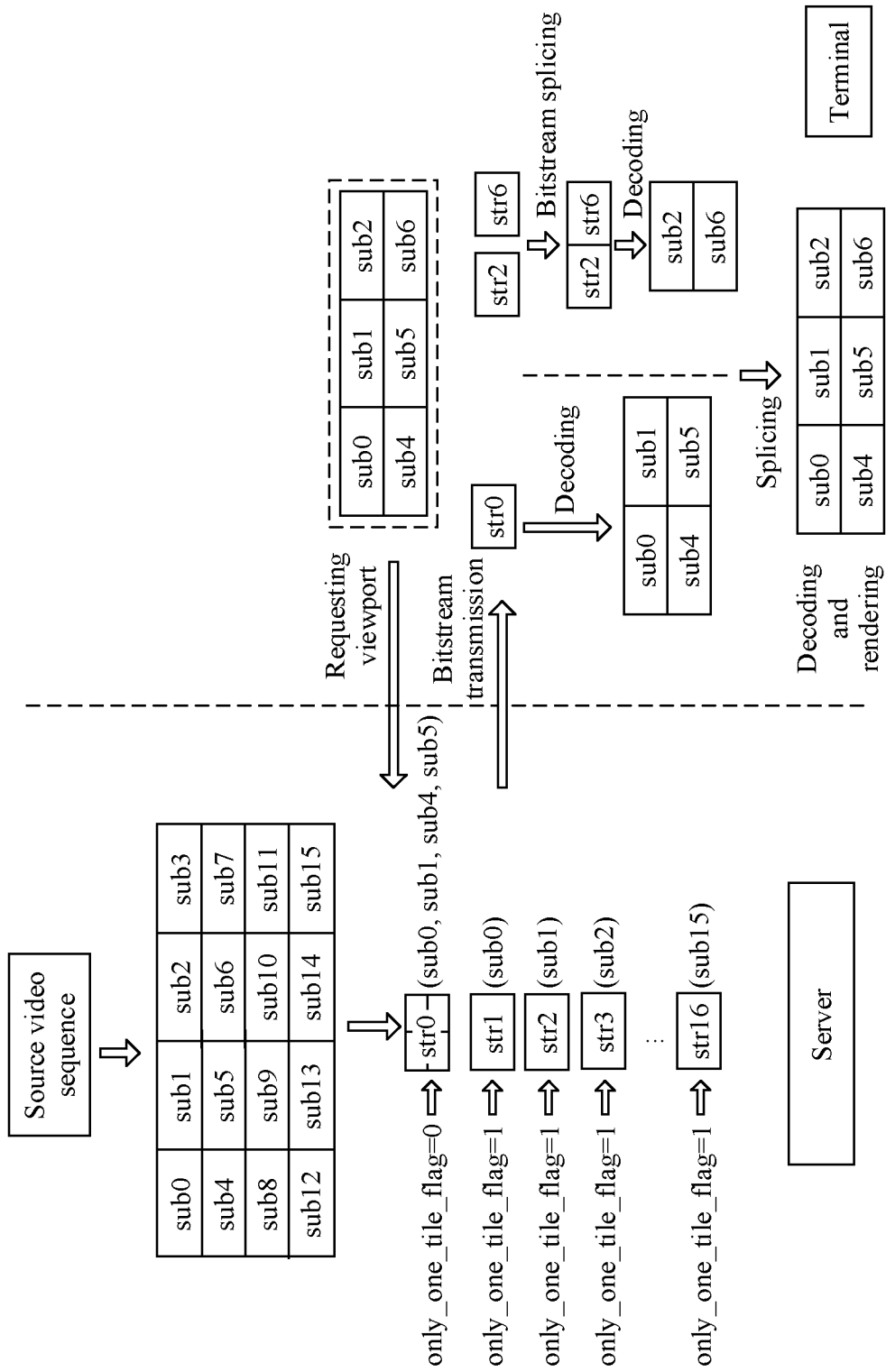
FIG. 14 is a schematic diagram of sixth bitstream splicing according to an embodiment of this application.

For example, as shown in FIG. 14, str0 is a sub-bitstream that cannot be used for splicing. Pictures obtained by the terminal by decoding the sub-bitstream str0 include sub0, sub1, sub4, and sub5, and pictures obtained after the spliced bitstream is decoded include sub2 and sub6, display pictures obtained after picture splicing is performed on the two pictures include sub0 to sub2 and sub4 to sub6.

In this embodiment of this application, when it is determined that a sub-bitstream cannot be used for splicing, the sub-bitstream may be directly decoded, and picture splicing is performed on a decoded picture and a picture obtained after a spliced bitstream is decoded, to obtain a final display picture. Therefore, compared with discarding a sub-bitstream that cannot be used for splicing, this method can improve utilization of the sub-bitstream.

In an optional manner of this embodiment of this application, this embodiment provides a syntax element and semantics that are in an OMAF file format and that are used to indicate information about an amount of tile data included in a sub-bitstream. A change includes generation, by the server side, information about an amount of tile data included in a sub-bitstream, and parsing, by the terminal, the information about the amount of the tile data included in the sub-bitstream.

On a server side.

Each sub-bitstream is encapsulated, and each sub-bitstream may be independently encapsulated into a track, for example, a sub-picture track. Syntax description information about the amount of the tile data included in the sub-bitstream may be added to the sub-picture track. An example is as follows.

The following syntax is added to a spco box.

```
aligned(8) class SubPictureCompositionBox extends
    TrackGroupTypeBox('spco'){
    unsigned int(1) only_one_tile_presence_flag;
    bit(7) reserved=0;
    unsigned int(16) track_x;
    unsigned int(16) track_y;
    unsigned int(16) track_width;
    unsigned int(16) track_height;
    unsigned int(16) composition_width;
    unsigned int(16) composition_height;
}.
```

Semantics are as follows.

The only_one_tile_presence_flag has a value 1 indicates that a bitstream in a current track may be involved in splicing, and a value 0 indicates that a bitstream in a current track cannot be involved in splicing.

Alternatively, another representation manner is added to the spco box, and the following syntax is used

```
aligned(8) class SubPictureCompositionBox extends
    TrackGroupTypeBox('spco'){
    unsigned int(8) tile_num_subpicture;
    unsigned int(16) track_x;
    unsigned int(16) track_y;
    unsigned int(16) track_width;
    unsigned int(16) track_height;
    unsigned int(16) composition_width;
    unsigned int(16) composition_height;
}.
```

Semantics are as follows.

A value of tile_num_subpicture indicates a quantity of tiles in a bitstream in a track.

On a terminal side.

Based on user behavior, a terminal requests a required bitstream from the server, and decapsulates the bitstream. In a decapsulation process, SubPictureCompositionBox in the spco box is parsed to obtain syntax information about an amount of tile data included in a sub-bitstream, to obtain information about whether each sub-bitstream can be used for splicing, and a track whose only_one_tile_presence_flag is 1 is selected for subsequent processing.

In a possible implementation of this embodiment of this application, in this embodiment, the information about the amount of the tile data included in the sub-bitstream is described in a file format specified by an ISOBMFF. In the file format, for the information about the amount of the tile data included in the sub-bitstream, a sample entry type 'onti' is added to the track. When a sample entry name is 'onti', it indicates that a sub-bitstream in a current track includes one piece of tile data, to indicate that the sub-bitstream can be used for splicing.

In an optional implementation of this embodiment of this application, in this embodiment, the information about the amount of the tile data included in the sub-bitstream is described in an MPD file.

On the server side, an example of describing the information of the amount of the tile data included in the sub-bitstream in the MPD file is as follows.

```
<?xml version="1.0" encoding="UTF-8"?>
<MPD
    xmlns="urn:mpeg:dash:schema:mpd:2011"
    type="static"
```

-continued

```
    mediaPresentationDuration="PT10S"
    minBufferTime="PT1S"
    profiles="urn:mpeg:dash:profile:isoff-on-demand:2011">
    <Period>
    <AdaptationSet segmentAlignment="true" subsegmentAlignment="true"
subsegmentStartsWithSAP="1">
        <EssentialProperty schemeIdUri="urn:mpeg:dash:onti:2014"
        value="1"/>
        <Representation mimeType="video/mp4" codecs="mcc"
        width="640"
height="640" bandwidth="79707" startWithSAP="1">
            <BaseURL> src.mp4</BaseURL>
            <SegmentBase indexRangeExact="true" indexRange="837-
            988"/>
        </Representation>
    </AdaptationSet>
...
    </Period>
</MPD>.
```

In this example, a new EssentialProperty attribute onti@value is specified, which is used to describe the information about the amount of the tile data included in the substream. Descriptions of the onti@value attribute are shown in Table 4. When the terminal side requests video content, the element is parsed to obtain the information about the amount of the tile data included in the sub-bitstream. When the amount is greater than 1, the tile data can be involved in splicing, otherwise, the tile data cannot be involved in splicing.

TABLE 4 onti@value attribute description in "urn:mpeg:dash:mcsp:2014"

| Mcsp@value | Description |
| --- | --- |
| Tile_num_subpicture | specifies the number of tiles |

Semantics of the syntactic elements are as follows.

Tile_num_subpicture indicates a quantity of tiles in the track.

In addition, in a representation field of the MPD file, the information about the amount of the tile data included in the sub-bitstream may also be added.

In addition, in an alternative manner, flag information may also be used to identify whether the sub-bitstream can participate in bitstream splicing. Descriptions of the onti@value attribute are shown in Table 5. When the terminal requests video content, the element is parsed to obtain the information about whether the sub-bitstream can participate in bitstream splicing.

TABLE 5 onti@value attribute description in "urn:mpeg:dash:mcsp:2014"

| Mcsp@value | Description |
| --- | --- |
| only_one_tile_flag | specifies whether the track could be aggregated into new bitstream |

Semantics of the syntactic elements are as follows.

The only_one_tile_flag comprises a value 1 which indicates that the track can be used for bitstream splicing, and a value 0 indicates that the track cannot be used for bitstream splicing.

Optionally, only_one_tile_flag in this embodiment of this application may be replaced with merge_enable_flag, and merge_enable_flag is used to indicate indication information indicating whether a sub-bitstream can be used for splicing. In this embodiment of this application, only only_one_tile_flag is used as an example for description.

In addition, in a representation field of the MPD file, the information about the amount of the tile data included in the sub-bitstream may also be added. In this example, a value "mcc" of a codecs field is added. After a terminal side obtains the information, it indicates that a predicted motion vector of a current sub-bitstream is constrained, and a predicted pixel does not exceed one or more boundaries of a sub-picture.

In another embodiment of this application.

Figure 15:
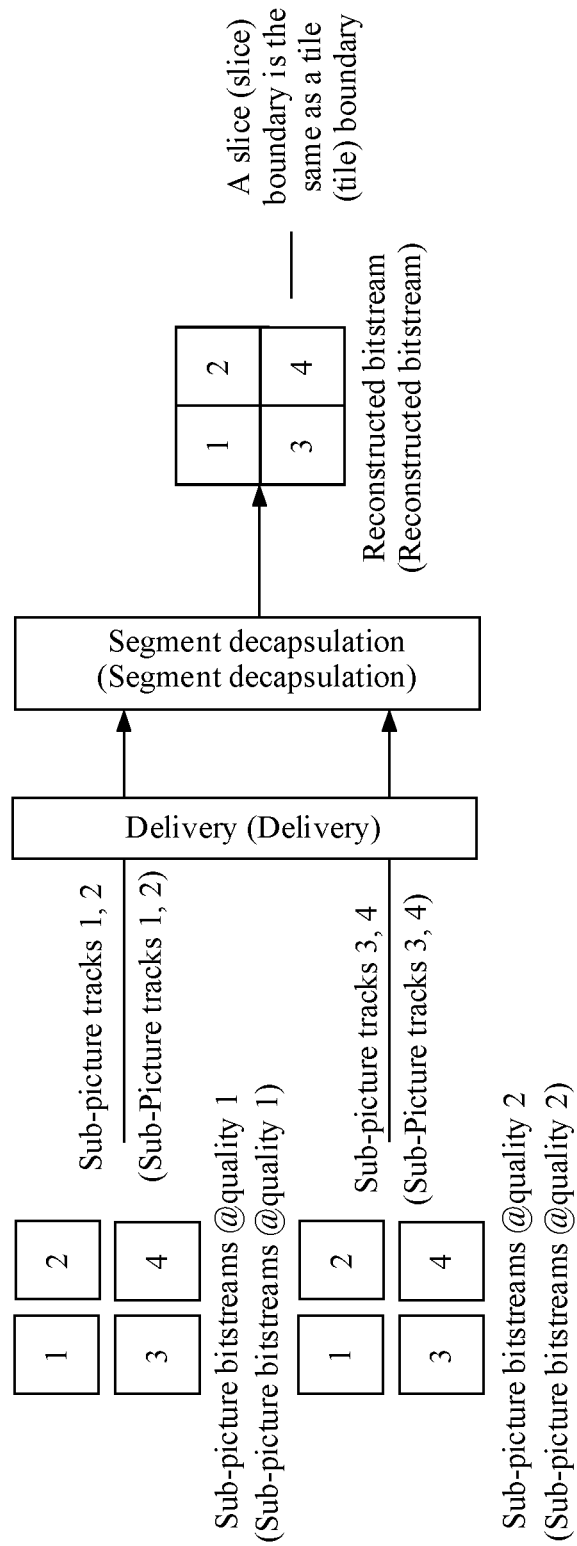
FIG. 15 is a schematic diagram of seventh bitstream splicing according to an embodiment of this application.

FIG. 15 shows an example of how MCTS-based sub-picture tracks of the same resolution can be reconstructed to form a HEVC conforming bitstream. A 2×2 tile grid has been used in the tile sets and each motion-constrained tile set sequence is included in one sub-picture track. Each tile set originated from sub-picture bitstream is treated as a slice in the reconstructed bitstream and SS header of each slice in the reconstructed bitstream should be modified accordingly.

To initialize HEVC decoder correctly, corresponding initialization data such as an SPS and a PPS should be regenerated.

Details of SS header parameters and initialization parameters involved are as follows.

1. In the SS header of each slice in reconstructed bitstream, first_slice_segment_in_pic_flag and slice_segment_address should be set accordingly.

| slice_segment_header( ) { | Descriptor |
| --- | --- |
| first_slice_segment_in_pic_flag | u(1) |
| ... | |
| if( !first_slice_segment_in_pic_flag ) { | |
| ... | |
| slice_segment_address | u(v) |
| } | |
| ... | |
| } | |

2. In a VPS, profile_tier_level should be set accordingly.

| | Descriptor |
| --- | --- |
| video_parameter_set_rbsp( ) { | |
| ... | |
| profile_tier_level( 1, vps_max_sub_layers_minus1 ) | |
| ... | |
| } | |
| profile_tier_level( profilePresentFlag, maxNumSubLayersMinus1 ) { | |
| ... | |
| general_level_idc | u(8) |
| ... | |
| for( i = 0; i < maxNumSubLayersMinus1; i++ ) { | |
| if( sub_layer_level_present_flag[i] ) | |
| sub_layer_level_idc[i] | u(8) |
| } | |
| } | |

3. In an SPS, pic_width_in_luma_samples and pic_height_in_luma_samples should be recalculated and set accordingly.

| seq_parameter_set_rbsp( ) { | Descriptor |
|---|---|
| ... | |
| pic_width_in_luma_samples | ue(v) |
| pic_height_in_luma_samples | ue(v) |
| ... | |
| } | |

4. In a PPS, parameters involved are as follows.

| pic_parameter_set_rbsp( ) { | Descriptor |
|---|---|
| ... | |
| tiles_enabled_flag | u(1) |
| ... | |
| if( tiles_enabled_flag ) { | |
| num_tile_columns_minus1 | ue(v) |
| num_tile_rows_minus1 | ue(v) |
| uniform_spacing_flag | u(1) |
| if( !uniform_spacing_flag ) { | |
| for( i = 0; i < num_tile_columns_minus1; i++ ) | |
| column_width_minus1[i] | ue(v) |
| for( i = 0; i < num_tile_rows_minus1; i++ ) | |
| row_height_minus1[i] | ue(v) |
| } | |
| loop_filter_across_tiles_enabled_flag | u(1) |
| } | |
| pps_loop_filter_across_slices_enabled_flag | u(1) |
| ... | |
| } | |

As the example show in FIG. 15, tiles_enabled_flag should be set to 1, num_tile_columns_minus1 and num_tile_rows_minus1 should be set to 1, uniform_spacing_flag should be set to 1, loop_filter_across_tiles_enabled_flag and pps_loop_filter_across_slices_enabled_flag should be set to 0.

Translation is as follows.

FIG. 15 shows an example of how MCTS-based sub-picture tracks of the same resolution can be reconstructed to form a HEVC conforming bitstream. A 2×2 tile grid has been used in the tile sets and each motion-constrained tile set sequence is included in one sub-picture track. Each tile set originated from sub-picture bitstream is treated as a slice in the reconstructed bitstream and SS header of each slice in the reconstructed bitstream should be modified accordingly. In a possible implementation, a tile boundary line and a slice boundary line in FIG. 15 are the same.

To initialize HEVC decoder correctly, corresponding initialization data such as an SPS and a PPS should be regenerated.

Details of SS header parameters and initialization parameters involved are shown in the foregoing four tables.

As the example show in FIG. 15, tiles_enabled_flag should be set to 1, num_tile_columns_minus1 and num_tile_rows_minus1 should be set to 1, uniform_spacing_flag should be set to 1, loop_filter_across_tiles_enabled_flag and pps_loop_filter_across_slices_enabled_flag should be set to 0.

Another embodiment of this application is as follows.

Figure 16:
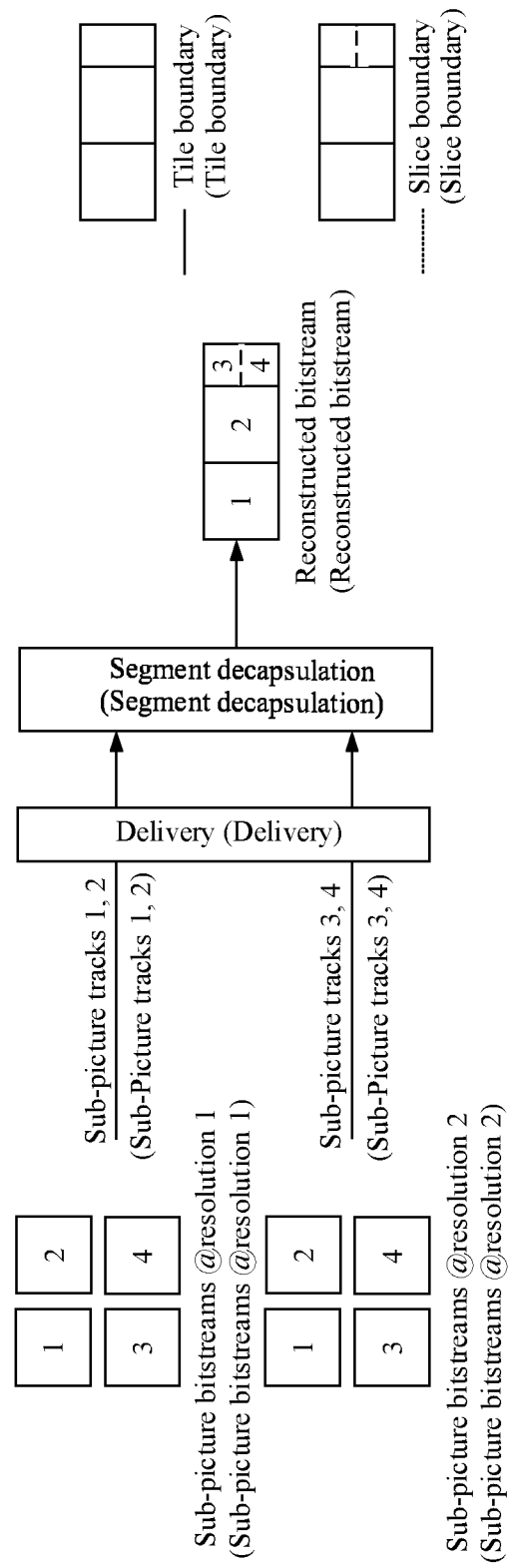
FIG. 16 is a schematic diagram of eighth bitstream splicing according to an embodiment of this application.

For sub-picture tracks with several resolutions, the reconstructed bitstream should comply with HEVC tile and slice syntax. FIG. 16 gives an example of how to reconstruct from tracks with different resolutions.

Notice that bitstreams from sub-picture track 3 and 4 are reconstructed to form one tile with two slices.

In some cases, bitstreams from different resolutions might not be able to form HEVC conforming bitstream in anyway, then in such cases, an OMAF player may choose to do reconstruction from same resolution and enable two HEVC decoders for different resolutions.

Translation is as follows.

For sub-picture tracks with several resolutions, the reconstructed bitstream should comply with HEVC tile and slice syntax. FIG. 16 gives an example of how to reconstruct from tracks with different resolutions.

Notice that bitstreams from sub-picture track 3 and 4 are reconstructed to form one tile with two slices.

In some cases, bitstreams from different resolutions might not be able to form HEVC conforming bitstream in anyway, then in such cases, an OMAF player may choose to do reconstruction from same resolution and enable two HEVC decoders for different resolutions.

In another possible implementation of this embodiment of this application, this embodiment provides a server apparatus. The server is a server that generates information about an amount of tile data included in the sub-bitstream described in this application, or information used to indicate whether the sub-bitstream can be used for splicing. The information is written into SEI of a bitstream, or the information is written into a file in the manner described in this application. The server may not be responsible for original bitstream encoding, for example, the server may be a transcoding server, or a server that only generates the information, and is configured to store a bitstream or a file that carries the information described in this application.

In a solution in this embodiment of this application, information about an amount of tile data included in a bitstream is added to an SEI message or an OMAF file format of the bitstream such that it is possible to determine, based on the amount of the tile data, a sub-bitstream that can be used for splicing. Bitstream splicing processing enables a single decoder to decode all sub-bitstreams in one decoding operation after a plurality of sub-bitstreams are spliced, and no additional track information needs to be transmitted, thereby saving bandwidth and reducing complexity of system layer stream management.

Figure 17:
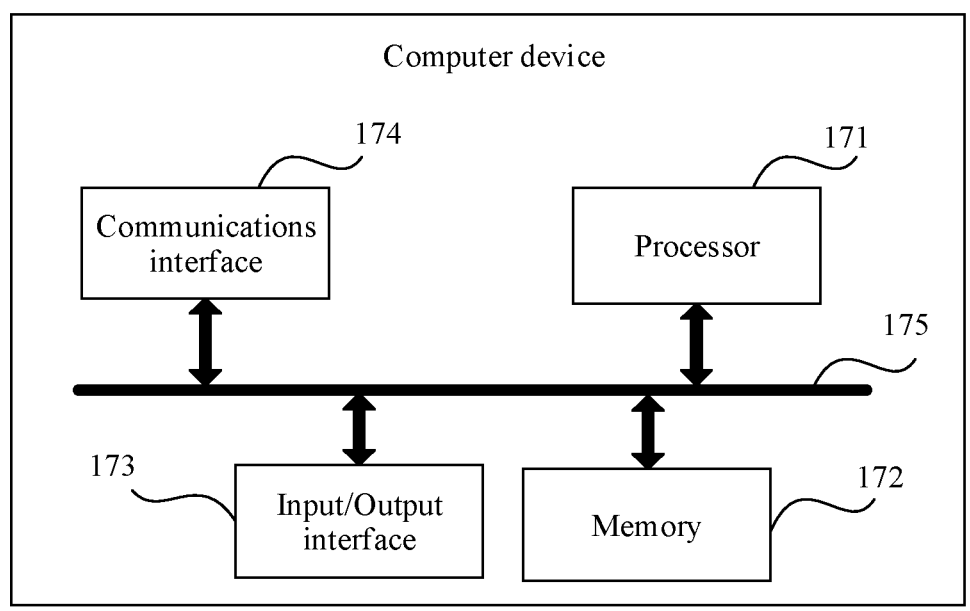
FIG. 17 is a schematic structural diagram of a computer device according to an embodiment of this application.

FIG. 17 is a schematic structural diagram of hardware of a computer device according to an embodiment of this application. As shown in FIG. 17, the computer device may be used as an implementation of a media information processing apparatus or an implementation of a media information processing method. The computer device includes a processor 171, a memory 172, an input/output interface 173, and a bus 175, and may further include a communications interface 174. The processor 171, the memory 172, the input/output interface 173, and the communications interface 174 implement a mutual communication connection using the bus 175.

The processor 171 may use a central processing unit (CPU), a microprocessor, an application specific integrated circuit (ASIC), or one or more integrated circuits, and is configured to execute a related program, to implement a function that needs to be executed by a module in the streaming media information processing apparatus provided in the embodiments of the present disclosure, or perform the streaming media information processing method corresponding to the method embodiments of the present disclosure. The processor 171 may be an integrated circuit chip and has a signal processing capability. In an implementation process, steps in the foregoing methods can be implemented using a hardware integrated logical circuit in the processor 171, or using instructions in a form of software. The processor 171 may be a general purpose processor, a digital signal processor (DSP), an ASIC, a field programmable gate array (FPGA) or another programmable logic device, a discrete gate or a transistor logic device, or a discrete hardware component. It may implement or perform the methods, the steps, and logical block diagrams that are disclosed in the embodiments of the present disclosure. The general purpose processor may be a microprocessor, or the processor may be any conventional processor or the like. Steps of the methods disclosed with reference to the embodiments of this application may be directly executed and accomplished by means of a hardware decoding processor, or may be executed and accomplished using a combination of hardware and software modules in the decoding processor. A software module may be located in a mature storage medium in the art, such as a random-access memory (RAM), a flash memory, a read-only memory (ROM), a programmable read-only memory (PROM), an electrically erasable programmable memory (EEPROM), or a register. The storage medium is located in the memory 172. The processor 171 reads information in the memory 172, and completes, with reference to hardware of the processor 171, a function that needs to be executed by a module included in the media information processing apparatus provided in the embodiments of this application, or performs the media information processing method provided in the method embodiments of this application.

The memory 172 may be a ROM, a static storage device, a dynamic storage device, or a RAM. The memory 172 may store an operating system and another application program. When a function that needs to be executed by a module included in the media information processing apparatus provided in the embodiments of this application is implemented using software or firmware, or the media information processing method provided in the method embodiments of this application is performed, program code used to implement the technical solutions provided in the embodiments of this application is stored in the memory 172, and the processor 171 executes an operation that needs to be executed by a module included in the media information processing apparatus, or performs the media information processing method provided in the method embodiments of this application.

The input/output interface 173 is configured to receive input data and information, and output data such as an operation result.

The communications interface 174 uses a transceiver apparatus, for example, but not limited to, a transceiver, to implement communication between the computer device and another device or a communications network. The communications interface 174 may be used as an obtaining module or a sending module in a processing apparatus.

The bus 175 may include a channel for transferring information between components (such as the processor 171, the memory 172, the input/output interface 173, and the communications interface 174) of the computer device.

It should be noted that, although only the processor 171, the memory 172, the input/output interface 173, the communications interface 174, and the bus 175 of the computer device in FIG. 17 are shown, in a specific implementation process, a person skilled in the art should understand that the computer device further includes another component required for normal operation, for example, a display configured to display to-be-played video data. In addition, according to a specific requirement, a person skilled in the art should understand that the computer device may further include hardware components for implementing other additional functions. In addition, a person skilled in the art should understand that the computer device may include only components essential for implementing the embodiments of this application, but not necessarily include all the components shown in FIG. 17.

It should be noted that, for brief description, the foregoing method embodiments are represented as a series of actions. However, a person skilled in the art should appreciate that this application is not limited to the described order of the actions, because according to this application, some steps may be performed in other orders or simultaneously. It should be further appreciated by a person skilled in the art that the embodiments described in this specification all belong to embodiments, and the involved actions and modules are not necessarily required by this application.

In another embodiment of this application, a readable storage medium is further provided. The readable storage medium stores a computer-executable instruction. A device (which may be a single-chip microcomputer, a chip, or the like) or a processor performs some or all steps in the media information processing method provided in the foregoing method embodiments. The foregoing readable storage medium may include any medium that can store program code, such as a Universal Serial Bus (USB) flash drive, a removable hard disk, a read-only memory, a random access memory, a magnetic disk, or an optical disc.

In another embodiment of this application, a computer program product is further provided. The computer program product includes a computer-executable instruction. The computer-executable instruction is stored in a computer-readable storage medium. At least one processor of a device may read the computer-executable instruction from the computer-readable storage medium. The at least one processor executes the computer-executable instruction to enable the device to perform some or all steps in the media information processing method provided in the foregoing method embodiments.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A media information processing method, comprising:
   obtaining sub-bitstream data, wherein the sub-bitstream data comprises indication information, and wherein the indication information indicates an amount of tile data comprised in the sub-bitstream data or indicates whether the sub-bitstream data can be used for splicing; and
   processing the sub-bitstream data based on the indication information.

2. The media information processing method of claim 1, wherein the sub-bitstream data comprise supplementary enhancement information (SEI), and wherein the SEI carries the indication information.

3. The media information processing method of claim 1, wherein a box of a track carries the indication information.

4. The media information processing method of claim 1, wherein a sample entry type of a track carries the indication information.

5. The media information processing method of claim 1, wherein a media presentation description (MPD) file carries the indication information.

6. The media information processing method of claim 1, wherein the sub-bitstream data further comprises video parameter set (VPS) information, and wherein the media information processing method further comprises further processing the sub-bitstream data based on the VPS information.

7. The media information processing method of claim 1, wherein the sub-bitstream data further comprises sequence parameter set (SPS) information, and wherein the media information processing method further comprises further processing the sub-bitstream data based on the SPS information.

8. The media information processing method of claim 1, wherein the sub-bitstream data further comprises picture parameter set (PPS) information, and wherein the media information processing method further comprises processing the sub-bitstream data based on the indication information and the PPS information.

9. The media information processing method of claim 1, wherein the sub-bitstream data further comprises slice segment (SS) information, and wherein the media information processing method further comprises further processing the sub-bitstream data based on the SS information.

10. A media information processing method, comprising:
obtaining sub-bitstream data of an original image, wherein the sub-bitstream data comprises tile data;
determining indication information of the sub-bitstream based on an amount of the tile data, wherein the indication information indicates the amount or indicates whether the sub-bitstream data can be used for splicing; and
sending the sub-bitstream data to a terminal,
wherein the sub-bitstream data comprises the indication information.

11. A media information processing apparatus, comprising:
a receiver configured to obtain sub-bitstream data, wherein the sub-bitstream data comprises indication information, and wherein the indication information indicates an amount of tile data comprised in the sub-bitstream data or indicates whether the sub-bitstream data can be used for splicing; and
a processor coupled to the receiver and configured to process the sub-bitstream data based on the indication information.

12. The media information processing apparatus of claim 11, wherein the sub-bitstream data comprise supplementary enhancement information (SEI), and wherein the SEI carries the indication information.

13. The media information processing apparatus of claim 11, wherein a box of a track carries the indication information.

14. The media information processing apparatus of claim 11, wherein a sample entry type of a track carries the indication information.

15. The media information processing apparatus of claim 11, wherein a media presentation description (MPD) file carries the indication information.

16. The media information processing apparatus of claim 11, wherein the sub-bitstream data further comprises video parameter set (VPS) information, and wherein the processor is further configured to process the sub-bitstream data based on the VPS information.

17. The media information processing apparatus of claim 11, wherein the sub-bitstream data further comprises sequence parameter set (SPS) information, and wherein the processor is further configured to process the sub-bitstream data based on the SPS information.

18. The media information processing apparatus of claim 11, wherein the sub-bitstream data further comprises picture parameter set (PPS) information, and wherein the processor is further configured to process the sub-bitstream data based on the PPS information.

19. The media information processing apparatus of claim 11, wherein the sub-bitstream data further comprises slice segment (SS) information, and wherein the processor is further configured to process the sub-bitstream data based on the SS information.

20. A media information processing apparatus, comprising:
a receiver configured to obtain sub-bitstream data of an original image, wherein the sub-bitstream data comprises tile data;
a processor coupled to the receiver and configured to determine indication information of the sub-bitstream based on an amount of the tile data, wherein the indication information indicates the amount or indicates whether the sub-bitstream data can be used for splicing; and
a transmitter coupled to the processor and configured to send the sub-bitstream data to a terminal,
wherein the sub-bitstream data comprises the indication information.

* * * * *